United States Patent [19]
Tanaka et al.

[11] Patent Number: 6,165,528
[45] Date of Patent: Dec. 26, 2000

[54] METHOD OF INJECTION INTO MEAT AND PICKLE INJECTOR FOR USE THEREIN

[75] Inventors: Yoshihiko Tanaka; Takashi Tsuzuku; Akihiro Suzuki, all of Tsuchiura, Japan

[73] Assignee: Prima Meat Packers, Ltd., Tokyo, Japan

[21] Appl. No.: 09/311,862

[22] Filed: May 14, 1999

Related U.S. Application Data

[62] Division of application No. 09/076,729, May 13, 1998, Pat. No. 6,014,926.

[30] Foreign Application Priority Data

| May 13, 1997 | [JP] | Japan | 9-121924 |
| Jun. 19, 1997 | [JP] | Japan | 9-162964 |
| Sep. 18, 1997 | [JP] | Japan | 9-253678 |

[51] Int. Cl.[7] .............................. A23L 1/31; A22C 17/00
[52] U.S. Cl. ................... 426/281; 426/323; 426/574; 426/641; 452/57; 452/62
[58] Field of Search .................... 99/487, 533, 535; 426/281, 323, 574, 641; 452/62, 57

[56] References Cited

U.S. PATENT DOCUMENTS

| 2,418,914 | 4/1947 | Tichy . |
| 3,016,004 | 1/1962 | Harper, Jr. et al. . |
| 3,436,230 | 4/1969 | Harper, Jr. et al. . |
| 3,649,299 | 3/1972 | Sholl . |
| 3,675,567 | 7/1972 | Rejsa et al. ............................ 99/257 |
| 3,739,713 | 6/1973 | Kudale et al. . |
| 3,769,037 | 10/1973 | Sholl . |
| 3,814,007 | 6/1974 | Lumby et al. . |
| 4,620,478 | 11/1986 | Corominas ............................... 99/553 |
| 5,053,237 | 10/1991 | Hendricks et al. . |
| 5,112,270 | 5/1992 | Howard et al. . |
| 5,176,071 | 1/1993 | Klaassen . |
| 5,200,223 | 4/1993 | Simonsen . |

FOREIGN PATENT DOCUMENTS

| 0 297 592 A1 | 1/1989 | European Pat. Off. . |
| 0 525 696 A2 | 2/1993 | European Pat. Off. . |
| 60-11799 | 4/1985 | Japan . |
| 5-244906 | 9/1993 | Japan . |
| 6-141763 | 5/1994 | Japan . |
| 6-209693 | 8/1994 | Japan . |
| 6-284877 | 10/1994 | Japan . |
| 7-149 | 1/1995 | Japan . |

*Primary Examiner*—Nina Bhat
*Attorney, Agent, or Firm*—Venable; Robert Kinberg

[57] ABSTRACT

Providing a method of injection into meat in which brine for curing or seasoning liquid is uniformly dispersed in a green meat efficiently and continuously without deteriorating a meat property; curing and seasoning can be accomplished without using a tumbling machine, a massage machine or the like for a long time; and the brine for curing and the seasoning liquid can be uniformly dispersed even if there is a difference of injection resistance in meat property. This can be achieved by using a pickle injector which is provided with a high-pressure liquid generator constituted of a plunger pump or the like, a coherent stream injection nozzle for injecting the brine for curing and a pressure control mechanism which can raise an injection pressure gradually from zero or a low pressure while injecting the liquid substance when the brine for curing is injected from the nozzle to the green meat.

22 Claims, 9 Drawing Sheets

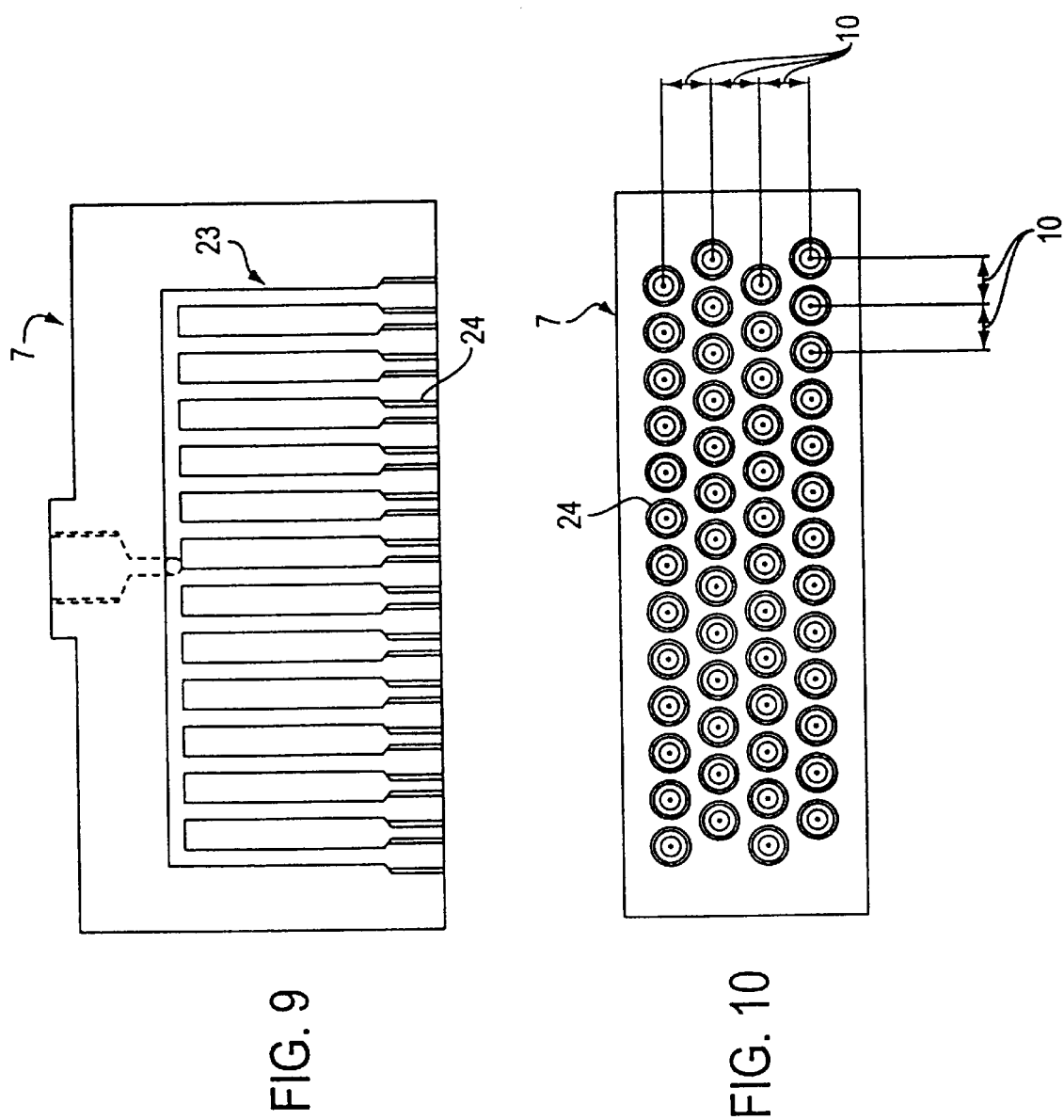

COMPARISON OF DISPERSED CONDITION
OF COLORANT AFTER INJECTION
PICKLE INJECTOR OF THE APPLICATION
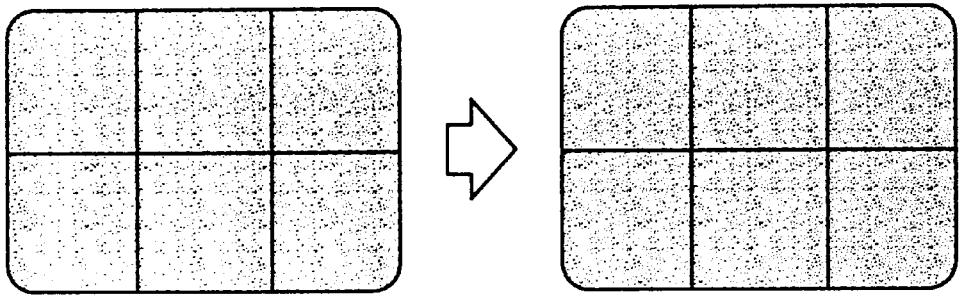
IMMEDIATELY AFTER INJECTION     AFTER CURED FOR 72 HRS
CONVENTIONAL MULTI-NEEDLE PICKLE INJECTOR
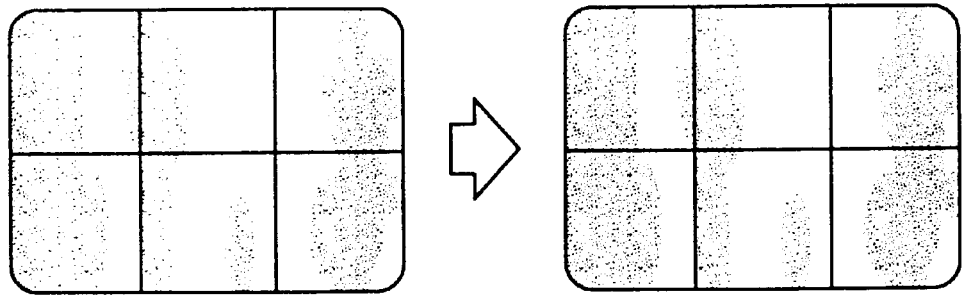
IMMEDIATELY AFTER INJECTION     AFTER CURED FOR 72 HRS
◯ PORTIONS INDICATE WHERE FOOD COLORING
IS INJECTED AND DISPERSED
FIG. 12

METHOD OF INJECTION INTO MEAT AND PICKLE INJECTOR FOR USE THEREIN

This application is a divisional application filed under 37 C.F.R. 1.53 (b) of application Ser. No. 09/076,729 filed May 13, 1998, now U.S. Pat. No. 6,014,926,

CROSS REFERENCE TO RELATED PATENT APPLICATIONS

This application claims priority of Japanese Application Nos. 9-121924, filed May 13, 1997; No. 9-162964, filed Jun. 19, 1997; and No. 9-253678, filed Sep. 18, 1997, the disclosures of which are incorporated herein by reference.

BACKGROUND OF THE INVENTION (1) Field of the Invention

The present invention relates to an injection method in which brine for curing, seasoning liquid or another liquid substance is injected to a block of pork, beef, poultry meat or another meat and the liquid substance is uniformly dispersed and a pickle injector for use in the method. Also, the present invention relates to a method of manufacturing meat products of pork, beef, poultry meat or the like, for example, cooked meat products or a raw ham or other uncooked meat products in a short time by using the injection method.

(2) Description of the Related Art

In meat processing there is a need for uniform dispersion of curing agent or seasoning in meat. In recent years, it has been common to use a multi-needle pickle injector.

By a method in which the multi-needle pickle injector is used, products, in which additives including brine for curing or seasoning liquid are dispersed more uniformly than former days, can be manufactured. However, immediately after injection, the liquid accumulates in portions into which needles are stuck. Therefore, after a dynamic stimulus is given with a tumbling machine, a massage machine or the like, a green meat needs to be cured until the brine for curing or the seasoning liquid permeates through the green meat and is uniformly dispersed. Then, the process can advance to the next step. In the existing circumstances, there is a problem that several days are taken to salt loin ham or boneless ham, or to season roast pork.

Additionally, the injection pressure of brine for curing in the multi-needle pickle injector is limited to about 12 kg/cm$^2$ owing to its structure. Among substances included in the seasoning liquid, a low-molecular substance such as salt can easily move inside the green meat. However, high-molecular substances, or substances having a high reactivity with meat constituent substances cannot easily move inside the green meat. As a result, the liquid is defectively dispersed.

For refinement in the existing multi-needle pickle injector, it is necessary to further increase the needle density of the multi-needle pickle injector. However, even a fine needle has a diameter of about 3 mm, and the width of a jig for fixing needles is also present. Therefore, it is difficult to improve upon the existing needle interval of 12–25 mm. Also, even if the improvement can be accomplished, an increase of the needle density is required, so that when the needles are put into and taken from the meat, resistance increases. Then, it becomes practically difficult to operate the device. Consequently, the injection by means of the multi-needle pickle injector cannot achieve an object of uniformly dispersing the liquid in the green meat in a short time.

Also, when the liquid is injected to a large green meat with the conventional multi-needle pickle injector, portions of a single green meat have different hardnesses. Even if uniform injection of the liquid is attempted, it cannot be uniformly injected because of a difference of injection resistance in meat property. For example, in Japanese Utility Model Publication No. 11799/1985 and Japanese Patent Application Laid-open No. 209693/1994, there are disclosed methods for solving the ununiformity of the brine for curing injection due to a difference between injection resistances of the meat. By the methods, however, it is difficult to obtain highly precise results. The methods disclosed in these reference are not satisfactory.

On the other hand, for the utilization of a needleless pickle injector and its injection method to a ham and another processed meat, the following prior art is known.

In Japanese Patent Application Laid-open No. 244906/1993, there is disclosed a method in which a liquid substance such as brine is introduced into a piece of meat with the needleless pickle injector under a high pressure by using spray nozzles. The pickle injector has a structure in which the thickness of a green meat is made constant by a pressure roller and a conveyor and the liquid substance is injected from the underside by the spray nozzles. Further, it is described that the interval between the nozzles is within 20 mm and the liquid substance can be injected into a 20 mm thick meat. Since diffusing spray nozzles are used in the pickle injector, as shown in FIG. 5 of the publication, the liquid substance spreads in a concentric manner. Non-injected portions and liquid overlapped portions are generated. It cannot be said that the liquid substance can be uniformly injected and dispersed by the method. Also, the pickle injector has a structure in which the meat is crushed and thinned, and the injection is then performed. The meat is damaged by a high spray pressure which concentrically spreads. Therefore, the pickle injector cannot be used for a thick meat.

Also in the method, the meat may be cracked and broken by the pressure roller.

Therefore, in the introduction method, even if thickness is reduced by the pressure roller, it is difficult to apply the method to pork ham or loin with a thickness exceeding 30 mm.

It is disclosed in the specification of U.S. Pat. No. 2,418,914 that, in order to soften meat in a short time after slaughtering, a meat softener of a lipid substance and a small amount of water or other edible particles are sprayed over a meat surface under high pressure at high speed and allowed to permeate through a depth of the meat and that meat muscle fibers are mechanically ruptured. However, the dispersed condition and the like of the edible particles are not detailed.

It is disclosed in the specifications of the U.S. Pat. Nos. 3,016,004 and 3,436,230 that a tip end of a nozzle is brought in contact with a meat surface to inject preservative liquid or another liquid under a high pressure and disperse the liquid without rupturing meat fibers. It is described as a concrete example that a high-speed liquid flow is injected to lean and fat of bacon belly by using an automatic injector which is provided with a lean injection nozzle and a fat injection nozzle.

In the specifications of U.S. Pat. Nos. 3,769,037 and 3,649,299, there is described a method for effectively limiting a penetration depth of liquid of softener and/or flavor application agent into meat. By allowing coherent stream from three directions to collide against one another at a focal point and losing and diffusing energy, the penetration depth is limited.

In a device described in the specification of the U.S. Pat. No. 3,675,567, while the injection nozzle described in the aforementioned specifications of the U.S. Pat. Nos. 3,769,037 and 3,649,299 is moved at the same speed as the meat, by the control of a solenoid valve which can be quickly turned on/off by an electric timer, softener, flavor application agent or another liquid is injected to poultry meat under a pressure of 1000 to 5000 psi and at a high speed.

The specifications of the U.S. Pat. Nos. 3,739,713 and 3,814,007 disclose an injection device in which liquid pressure in a nozzle path is increased until it reaches a predetermined value. After a valve is opened, liquid is quickly injected at a dash from tip ends of plural nozzle paths having various lengths in accordance with an amorphous green meat. In the device no liquid leakage occurs.

It is described in the specification of the U.S. Pat. No. 5,053,237 that to enhance softness and sensory quality of low-class meat, vegetable oil, fat or another binder is injected into a moving meat from a nozzle disposed at a predetermined distance from the meat under such a pressure that the binder can sufficiently penetrate through meat tissue. Meat connective tissue can be cut in transverse and vertical directions.

It is described in the specification of the U.S. Pat. No. 5,112,270 that, in order to perform water-jet slaughtering, cranium is ruptured under an ultra-high pressure (3000 to 4000 kg/cm$^2$).

In the specification of U.S. Pat. No. 5,200,223, there is described a method in which liquid is intermittently or periodically jetted in the form of a fine jet flow in a short time from high-pressure nozzle to meat continuously conveyed in a piping and the liquid is injected to a given depth of the meat.

In the specification of U.S. Pat. No. 5,176,071, there is described a method and a device in which, in order to improve a means for causing no damage on meat, a green meat on a conveyor is flattened to a predetermined thickness by a pressure roller and brought into contact with a spray nozzle. Without spraying injection stream to an outer surface of the meat, seasoning liquid or the like is uniformly dispersed.

However, in some of the aforementioned needleless pickle injectors and the injection methods using the injectors, the meat surface is damaged. In the other, the thickness of the green meat as an object is limited. They have no general-purpose properties. Above all, in a practical level for raw-material meat varying in thickness, it cannot be absolutely said that the liquid substance can be uniformly dispersed. Then, an injection method in which the injection pressure is controlled while injecting the liquid substance in such a manner that the liquid substance can be uniformly dispersed and a pickle injector for use in the method have not been known.

On the other hand, a meat product is largely classified into a cooked meat product subjected to heating and sterilizing and a uncooked meat product not subjected to heating and sterilizing. A raw ham belongs to the uncooked meat product. By using salt or the like, its keeping quality is enhanced. As a curing method for manufacturing the raw ham, a dry curing method, a brine curing method and a single needle injection method are authorized according to the Japanese food hygiene law. Generally, in the dry curing method, after shaping raw-material meat, the meat is directly rubbed with salt or the like. After the meat is cured in a refrigerator for 2 to 3 weeks, decuring is performed as required. Thereafter, smoking/drying is performed for 3 to 7 days. In the brine curing method, after shaping raw-material meat, the meat is pickled in curing liquid of salt or the like dissolved in water for about 2 weeks. Decuring is performed as required. Thereafter, smoking/drying is performed for 3 to 7 days. In the single needle injection method of curing liquid, after shaping raw-material meat, curing liquid which is formed by dissolving salt or the like in water is injected with a needle. After the meat is cured in a refrigerator for 7 to 10 days, smoking/drying is performed for 3 to 7 days.

Among the aforementioned curing methods, in the dry curing method, the curing period is as long as 2 to 3 weeks as aforementioned. Much space in the refrigerator is necessary. The salt content of the product tends to be high. Additionally, there is a large difference of salt content in each product. In the brine curing method, the curing period is slightly shortened as compared with the dry curing method, but as long as about 2 weeks. Each product has a large difference of salt content in the same manner as in the dry curing method. According to the single needle injection method, it takes about 2 weeks to manufacture the raw ham. The method is superior in manufacture period to the dry and brine curing methods in which the manufacture period is three to four weeks. However, a predetermined quantity of the curing liquid needs to be manually injected uniformly to the green meat with one needle. Therefore, the method provides a bad productivity and requires skill in operation. It cannot be absolutely said that the method is efficient.

Also, for the raw ham, in a known method, to shorten the curing period, a pork block and Brine are thrown into a massage machine and massaging is performed to allow the Brine component to permeate the pork block. Thereafter, manufacture is performed in a conventional method. Thereby, manufactured is a raw ham which has a small salt-content gradient in its surface and central portion, a low salt-content concentration and softness (Japanese Patent Application Laid-open No. 149/1995). To obtain a raw ham with a little dispersion of salt concentration in a product, in a known method, raw-material pork salted in a high salt concentration is desalted by circulating brine with a salt concentration of 1 to 4% (Japanese Patent Application Laid-open No. 141763/1994). Also, to manufacture a raw ham, a raw bacon or another uncooked meat product in a short period, a block of livestock meat is cured by using a curing agent and 5 to 30 parts by weight of sugar relative to 100 parts by weight of the livestock green meat. Drying and smoking are performed in conventional methods. Such method of manufacturing a uncooked meat product is also known (Japanese Patent Application Laid-open No. 284877/1994).

SUMMARY OF THE INVENTION

An object of the invention is to solve the problems in the aforementioned conventional multi-needle and needleless pickle injectors. Not only for thin but also thick raw-material meats and further in raw-material meats different in configuration and size, without deteriorating meat property, brine for curing or seasoning liquid is efficiently and continuously dispersed uniformly in a green meat. Without operating a tumbling machine, a massage machine or the like for a long time, curing or seasoning can be accomplished. Further, even when there is a difference of injection resistance in meat property, the brine for curing or the seasoning liquid can be uniformly dispersed. An object of the invention is to provide such a practical injection method, a pickle injector for use in the method and a method of manufacturing a meat product, especially a raw ham or another uncooked meat product by using the injector.

To find out an injection method in which the brine for curing or the seasoning liquid can be uniformly dispersed, inventors et al. first studied the multi-needle pickle injector mainly used at present, but no solution was found. Therefore, for the injection method using the needleless pickle injector, a prototype machine provided with a high-pressure liquid generator and a straight water flow injection nozzle (coherent stream injection nozzle) was produced, and studies were started. However, even by using the conventional needleless pickle injector, expected results could not be obtained. Then, to find out conditions actually applicable to meat processing, the prototype machine was modified. Additionally, a basic research of properties in the injecting and dispersing of the liquid substance into the green meat was pursued.

(Injection Depth)

As the property of the injecting and dispersing of the liquid substance into the green meat, first an injection depth of the liquid substance into the green meat (a distance from a green meat surface to a portion in the green meat which the injected liquid substance reaches at the time of injection) was studied by using pork ham. As a result of an experiment repeated by varying injection pressure and time, it was found that the injection depth is not usually related with the injection time, but is correlated with the injection pressure. Then, while conditions such as a nozzle-hole size which influence the pressure are constantly maintained, the experiment was repeated again. As a result, it was found that the injection depth and the injection pressure have a relationship shown in FIG. 1.

As clearly seen from FIG. 1, when the nozzle-hole size or other conditions influencing the pressure are made constant, the relationship between the injection depth of the liquid substance into the green meat and the maximum value of the injection pressure (hereinafter referred to as "the maximum injection pressure") can be represented by a linear expression. It was found that when the maximum injection pressure is the same, the injection depth is the same.

For example, when the nozzle-hole size is made constant as 3/1000 inch, the relationship between the injection depth and the maximum injection pressure can be represented by the following linear expression:

P=30.0H

P; maximum injection pressure ($kg/cm^2$)

H; injection depth (mm)

The experiment showed that the injection depth of the liquid substance into the green meat can be controlled by the maximum injection pressure. As a result, by measuring the thickness of the green meat beforehand, the necessary maximum injection pressure can be calculated. It has been found that the injected liquid substance can be prevented from passing through the green meat and jetting out of the green meat. Conversely, the liquid substance can be prevented from failing to be sufficiently injected to the end.

(Injection Quantity)

As the property of the injecting and dispersing of the liquid substance into the green meat, next an injection quantity of the liquid substance into the green meat was studied by using pork ham. The inventors et al. used a pickle injector having an modified straight water flow injection nozzle (coherent stream injection nozzle) to repeat an experiment by varying the injection pressure and time. It was found that when a pressure rising quantity per unit time (hereinafter referred to as "the pressure rising rate") is constant, the injection quantity is not related with the injection pressure, but is correlated with the injection time. Then, the experiment was again repeated to clarify the relationship between the injection quantity and the injection time. As a result, it was found that the injection quantity and the injection time have a relationship shown in FIG. 2.

As clearly seen from FIG. 2, the relationship between the injection quantity of the liquid substance into the green meat and a period of time for reaching the maximum injection pressure (hereinafter referred to as "the injection reaching time") can be represented by a linear expression.

The injection quantity can vary with the number of nozzles, the nozzle-hole size, a flow rate of a pump and the like. For example, when the nozzle-hole size is set to 3/1000 inch and the other conditions are made constant, the relationship between the injection quantity and the injection reaching time can be represented by the following linear expression:

T=Q/45

T; injection time (seconds)

Q; injection quantity (g)

From the experiment, it was found that when the injection reaching time is the same, the injection quantity is the same. Also, it was recognized that the injection quantity of the liquid substance into the green meat can be controlled by the injection reaching time.

(Injection Ratio)

Subsequently, as the property of the injecting and dispersing of the liquid substance into the green meat, an injection ratio of the liquid substance into the green meat was studied. Here, the injection ratio is represented by the following expression:

Injection ratio (%)=(green meat weight+injection liquid weight)/ green meat weight×100

In a repeated experiment, by using the pickle injector having the coherent stream injection nozzle and varying the injection pressure and time, the liquid was injected to a block of pork loin from nozzles arranged at constant intervals at an equal density, and the injection ratio was measured. As a result, it was found that in the case of the same injection ratio, the injection ratio is correlated with the maximum injection pressure and the injection reaching time. Then, by regulating the thickness of the green meat to vary the maximum injection pressure and by regulating the injection reaching time based on the results obtained beforehand by the injection into the green meat to obtain the injection ratios of 110, 120, 130 and 140%, the relationship of the maximum injection pressure and the injection time was examined when injection was performed into 20 green meat for each case. As a result, it was found that the maximum injection pressure and the injection time have a relationship shown in FIG. 3.

As seen from FIG. 3, in each injection ratio, points indicative of the relationship of the maximum injection pressure and the injection reaching time are distributed on a straight line. This means that when the pressure rising rate derived from the relationship of the maximum injection pressure and the injection reaching time is the same, by changing the maximum injection pressure in accordance with the thickness of the green meat, the injection time also changes. As a result, the equal injection ratio can be obtained.

Also, the experiment showed that when the pressure rising rate (represented by a straight slope in FIG. 3) is changed, the injection ratio changes. As a result, it was found that by adjusting the pressure rising rate, the injection ratio can be controlled.

The present inventors modified the prototype machine based on the aforementioned findings obtained from the basic research of the properties in the injecting and dispersing of the liquid substance into the green meat in the case of using the high-pressure liquid generator and the coherent stream injection nozzle, especially, based on the finding that the injection ratio can be controlled by adjusting the pressure rising rate. It was found that the liquid substance can be uniformly dispersed by controlling the injection pressure while injecting the liquid substance. Then, the present invention has been completed.

The invention provides a method of injecting a liquid substance into a green meat in which when the liquid substance is injected to the green meat by using a coherent stream injection nozzle, and the injection pressure is controlled while injecting the liquid substance.

The invention provides a method of injecting a liquid substance into a green meat in which a straight water flow (coherent stream) injection pressure is regulated beforehand to a pressure suitable for physical properties and thickness of the green meat or physical properties of the liquid substance as required. A coherent stream injection nozzle is brought in contact with the preferably fixed green meat. While injecting the liquid substance by using the coherent stream injection nozzle, the injection pressure is controlled to gradually increase or change from 0 or a low pressure.

The invention provides method of injecting a liquid substance into a green meat in which when the liquid substance is injected to the green meat by using a coherent stream injection nozzle, by changing a rising rate of the injection pressure in the range of, for example, from 100 to 20000 $kg/cm^2 \cdot second$, whereby an injection ratio of the liquid substance into the green meat is controlled.

The invention provides a method of manufacturing a meat product, especially, a raw ham or another uncooked meat product in which the aforementioned injection method is used.

The invention provides a pickle injector being a device for injecting a liquid substance into a green meat provided with a high-pressure liquid generator, a liquid-substance injecting section and a pressure controller which can control an injection pressure while injecting the liquid substance when the liquid substance is injected from the injecting section to the green meat. Also, the invention provides a pickle injector which is further provided with a meat thickness regulating section for making constant the meat thickness of a green meat and a meat thickness measurement section.

The invention provides a pickle injector in which the pressure controller in the aforementioned pickle injector has a pressure control mechanism which can gradually raise the injection pressure from 0 or a low pressure; a pickle injector which controls the injection pressure by controlling the number of rotations of a servo motor or the like; and a pickle injector having a residual pressure cut means which can quickly reset to 0 or a low pressure an injection pressure gradually raised from 0 or the low pressure.

The invention provides a pickle injector in which the injecting section in the aforementioned pickle injector has a coherent stream injection nozzle; a pickle injector in which the injecting section has one manifold or plural interconnected manifolds for branching a single stream to plural streams; and a pickle injector in which one end of a robot hand is provided with the injecting section and a green meat conveying means.

BRIEF DESCRIPTION OF THE DRAWINGS

FIG. 9 is a vertical sectional view of an injecting section in the pickle injector of the invention.

FIG. 10 is a bottom view of the injecting section of the pickle injector of the invention.

FIG. 12 is an explanatory view showing a comparison of a distributed condition of colorant after injection between the pickle injector of the invention and the conventional multi-needle pickle injector.

DETAILED DESCRIPTION OF PREFERRED EMBODIMENTS

In the invention, examples of meat include, for example, pork, beef, poultry meat, horse meat, mutton, internal-organ meat, meat with bones and meat with skin, fish meat and the like. Any type of meat for food can be used.

In the invention, example of a liquid substance include, for example, brine for curing, seasoning liquid, modifier of lipid or another tissue, natural keeping agent, natural colorant, enzyme, solution of microorganism or the like and dispersion suspension. Liquid substance including gas or any other liquid substance can be used as long as it can be injected from a coherent stream injection nozzle or another injecting section into a green meat.

In the invention, a meat product means any processed meat. For example, according to the classification in the food hygiene law, the meat product corresponds to a dry meat product, an uncooked meat product, a specific cooked meat product or a cooked meat product. Among these, the uncooked meat product means a meat product which is not subjected to a process of heating a green meat to its center, for example, at 60° C. for 30 minutes, a process which provides an effect equal to or exceeding an effect of the heating process or another heating/sterilization. For example, a raw ham or a raw bacon of various raw materials can be exemplified.

In the invention, a straight water flow (coherent stream) means a flow of liquid substance which does not spout in a concentrically diffused manner, but spouts in a converged straight manner. A coherent stream injection nozzle means a nozzle for spouting the coherent stream. Also in the invention, an injection pressure means a liquid pressure of the liquid substance immediately after the liquid substance is spouted from the coherent stream injection nozzle. It is usually measured as a liquid pressure in a piping between a high-pressure liquid generator and the coherent stream injection nozzle by, for example, a pressure sensor. By providing the pressure sensor, the injection pressure can be further regulated to a set value.

Figure 1:
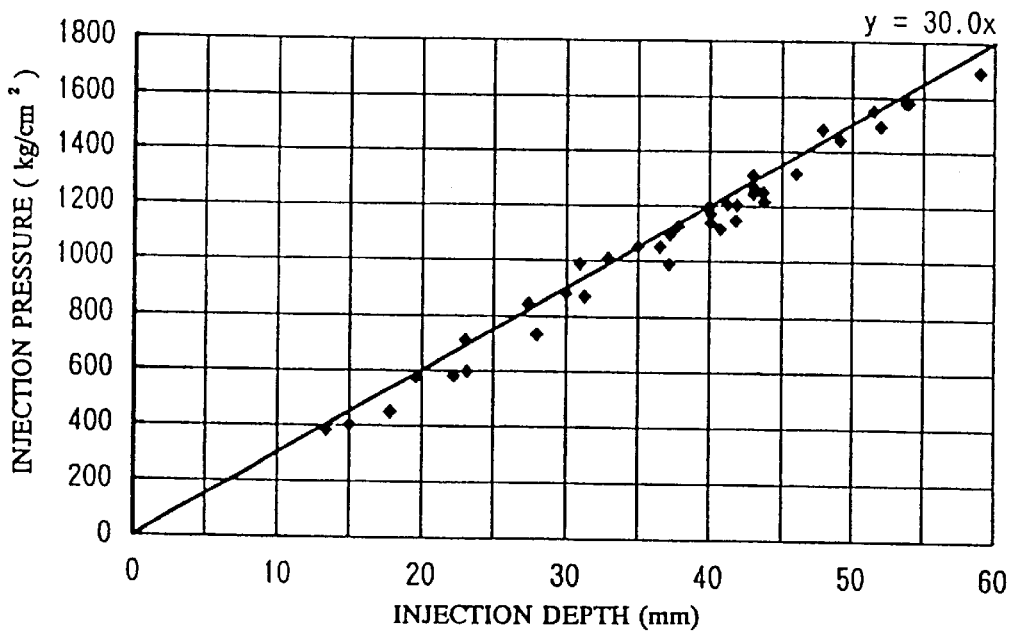
FIG. 1 is a graph showing a relationship of an injection depth and a maximum injection pressure in the case of injection with a pickle injector of the invention.
Figure 2:
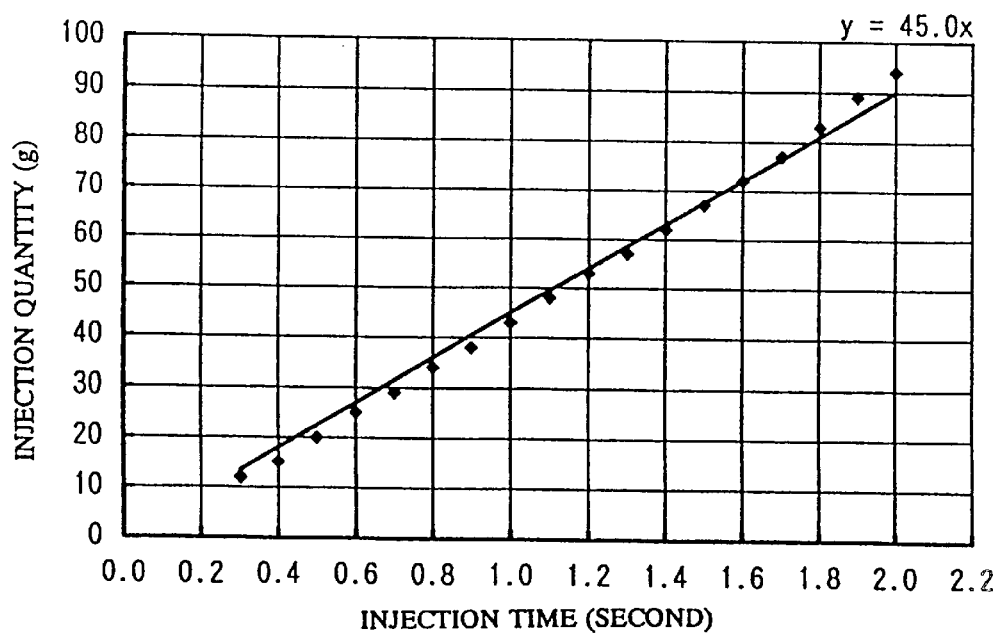
FIG. 2 is a graph showing an injection time and an injection quantity in the case of injection with the pickle injector of the invention.
Figure 3:
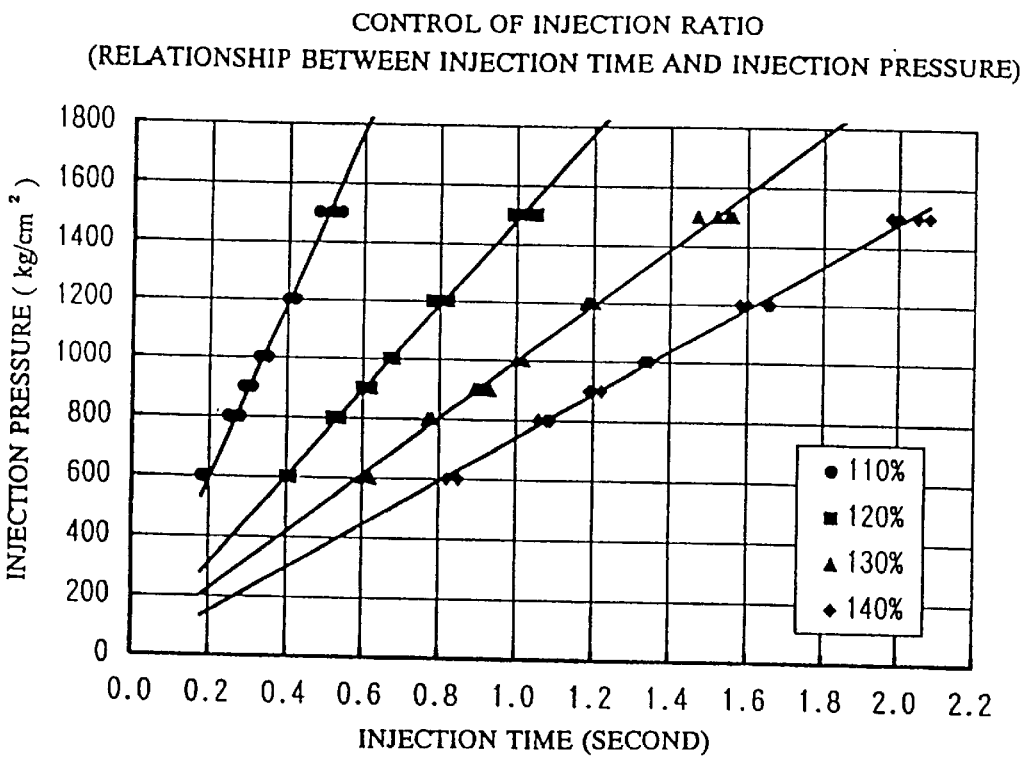
FIG. 3 is a graph showing a relationship of the maximum injection pressure and the injection time at injection ratios of 110, 120, 130 and 140% in the case of injection with the pickle injector of the invention.
Figure 4:
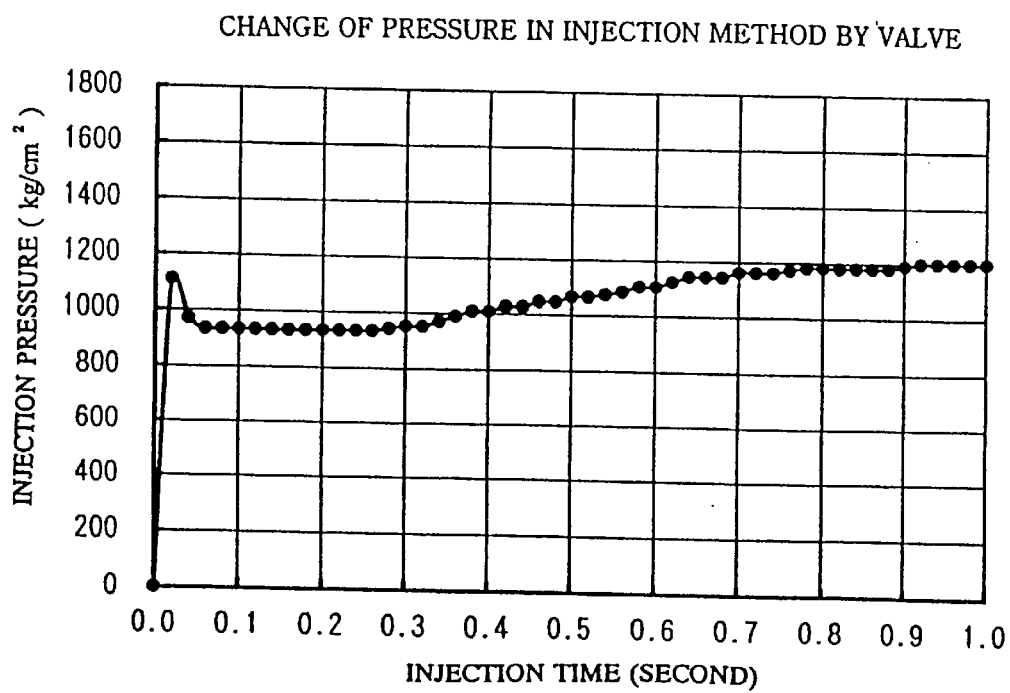
FIG. 4 is a graph showing a change with time in injection pressure in the case of injection with a conventional needleless pickle injector.
Figure 5:
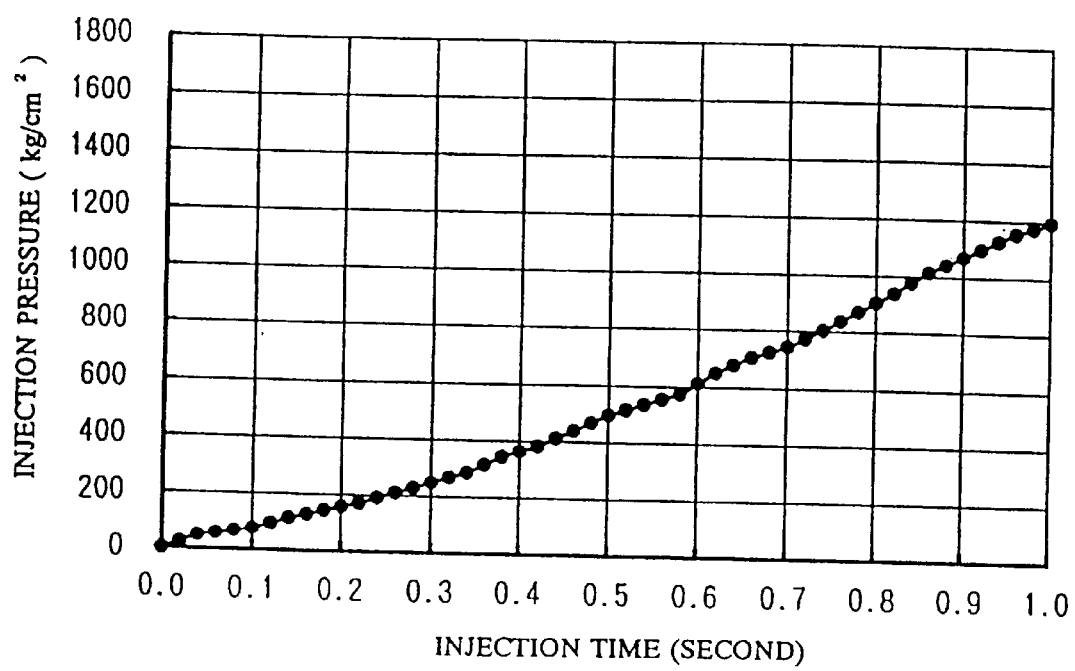
FIG. 5 is a graph showing a change with time in injection pressure in the case of injection with a needleless pickle injector of the invention.

In the invention, "controlling the injection pressure while injecting the liquid substance" means that the injection pressure is controlled by a means for controlling the injection pressure from the start of injection of the liquid substance untill the completion thereof, and excludes the case where the liquid substance is injected at a dash by opening/closing a valve disposed in a high-pressure piping and the case where the injection pressure is changed beforehand by replacing a nozzle different in hole diameter prior to injection. Then, in the invention in which the injection pressure is controlled while the liquid substance is being injected, the rising rate of the injection pressure is usually set in the range of 100 to 20000 kg/cm$^2$·second. By comparing a change of pressure in the conventional injection method utilizing the opening/closing of the valve shown in FIG. 4 with that of pressure in the injection method of the invention shown in FIG. 5, the technical meaning of "controlling the injection pressure while injecting the liquid substance" is further clarified.

In the invention, in order to uniformly disperse the liquid substance in the green meat, it is preferable that while injecting the liquid substance from the coherent stream injection nozzle, the injection pressure is gradually, preferably gradually and continuously raised from 0 or a low pressure. When the coherent stream injection nozzle is used, as the property in the injecting and dispersing of the liquid substance to the green meat, the injected liquid substance is dispersed in a transverse direction at a predetermined depth by the resistance of meat tissue. When the injection pressure is gradually raised, the injection depth changes in accordance with the injection pressure. The liquid substance is dispersed in the transverse direction by the resistance of the meat tissue at the depth. Such phenomenon repeatedly occurs with the increase of the injection depth. Then, the liquid substance is uniformly dispersed from surface to bottom of the green meat. Therefore, by gradually raising the injection pressure from 0 or a low pressure, a product superior in uniform dispersion of the injected liquid substance can be obtained. Additionally, for the purpose of dispersing the liquid substance in a specific portion of the green meat and another purpose, the injection pressure can be stepwise raised from 0 or a low pressure without being raised gradually and continuously.

When, instead of controlling the injection pressure while injecting the liquid substance, the injection pressure is rapidly increased from the start as in a conventional case, then straightness is strengthened and the liquid substance is not dispersed in the vicinity of the nozzle. Then, the liquid substance is accumulated in portions at the injection depth matched with the injection pressure. To obtain a uniform dispersion state in the green meat, by using the pickle injector of the invention, while injection is being performed, the injection pressure needs to be gradually raised from 0 or a low pressure to the maximum injection pressure at a constant pressure rising rate.

The pickle injector of the invention is a device for injecting the liquid substance into the green meat. The pickle injector is provided with a high-pressure liquid generator, a liquid-substance injecting section, and a pressure controller which can control the injection pressure while injecting the liquid substance when the liquid substance is injected from the injecting section to the green meat.

The high-pressure liquid generator in the pickle injector of the invention may be any mechanism, as long as it can increase the pressure of the liquid substance to a high level, for example, 7 to 3000 kg/cm$^2$. Examples of the high-pressure liquid generator include reciprocal pumps such as a plunger pump and a fluid pressure cylinder as well as pumps such as a rotation pump and a centrifugal pump. Members other than the pumps may be used, if the pressure of the liquid substance can be set high. By controlling the number of rotations of a motor, the plunger pump or another pump is operated and output of the pump is controlled. In this or another case, the high-pressure liquid generator can be constituted integrally with the pressure controller described later. In the case of controlling the pressure with a valve or the like disposed in a high-pressure piping or in another case, the high-pressure liquid generator and the pressure controller may be provided separately.

The injecting section in the pickle injector of the invention may be of any type if it has an exhaust port from which the high-pressure liquid substance can be injected into the green meat. For a tip-end configuration, a nozzle is preferable. More preferable is a coherent stream injection nozzle which, instead of concentrically diffusing and spouting the liquid substance, can inject a flow of the liquid substance spouted in a straight converged manner, that is, a coherent stream. Additionally, in a particular process, a spray injection nozzle or a needle nozzle may be used.

Also, the high-pressure liquid substance is transferred from the high-pressure liquid generator via the high-pressure piping to the injecting section, and it is preferable to use the injecting section which has a member called a manifold for branching a single flow from the high-pressure piping to plural flows. The manifold is preferably placed on the tip end of the injecting section, but can be placed midway in the piping as the case may be.

The injecting section of the conventional high-pressure liquid generator is of a single-hole type or has a form in which the piping in the manifold is branched radially. The present inventors have manufactured a manifold especially suitable for a pickle injector for meat, and a piping in the manifold is branched and the branched pipes are parallelly arranged. Here, the parallel arrangement includes not only the arrangement where the pipes are arranged parallel in a row but also the arrangement where the pipes are arranged zigzag or parallel in multiple rows. By arranging nozzles parallel, a nozzle interval can be narrowed to 10 mm or less, e.g., 5.6 mm for injection. Therefore, a highly dense and uniform injection is feasible. Further preferably used is a manifold which has multiple coherent stream injection nozzles arranged parallel in this manner.

When the manifold is used, the high-pressure liquid substance is injected as the coherent stream from the nozzle on the tip end of each piping. The liquid substance is injected simultaneously from the parallel arranged nozzles to the green meat. Also, when one manifold is provided with multiple nozzles, the liquid substance can be efficiently injected in one injection process. However, if one manifold is provided with an excessively large number of nozzles, load is applied to the high-pressure liquid generator. In this case, plural manifolds are preferably interconnected, a valve is placed on the upstream side of each manifold and the valves are sequentially opened/closed in such a manner that the manifolds sequentially spout the liquid substance. For example, when three interconnected manifolds are operated by switching valves or the like, the raising/lowering of the liquid substance pressure can be saved twice as compared with the case where injection is performed three times with one manifold. High-speed operation can be advantageously accomplished.

The pressure controller in the pickle injector of the invention may be of any type if it has a mechanism for controlling the injection pressure. The pressure controller can be largely classified into a controller having a means for controlling the pressure in the high-pressure liquid generator, a controller having a means for controlling the pressure in the high-pressure piping or the injecting section and a controller having a combination of these means.

In the controller having the means for controlling the pressure in the high-pressure liquid generator, for example, a plunger of a plunger pump is operated by using a servo motor, a stepping motor or a three-phase motor having an inverter and controlling the number of rotations or the motor to control an output of the high-pressure liquid generator, i.e., the injection pressure. Alternatively, a piston of an oil pressure cylinder, a water pressure cylinder, an air cylinder or the like is operated by using a variable adjustment valve or the like and controlling a fluid pressure to control the output of the high-pressure liquid generator, i.e., the injection pressure.

Examples of the controller having the means for controlling the pressure in the high-pressure piping include a controller in which the output of the high-pressure liquid generator is made constant and one or more pressure regulation valves are disposed in the high-pressure piping, a controller which can operate the pressure regulation valve in the high-pressure piping by using an actuator, and a controller in which a buffer such as a piston cylinder for absorbing the pressure is placed on an end of a branch pipe connected to the high-pressure piping. Also, as the controller having the means for controlling the pressure of the injecting section available is a controller in which the output of the high-pressure liquid generator is made constant and a nozzle-hole diameter and the number of nozzles interconnected to the injecting section are changed.

Also, if necessary, control can be performed by combining the means for controlling the pressure in the high-pressure liquid generator and the means for controlling the pressure in the high-pressure piping and the injecting section. In any case, control can be performed simply and exactly and various pressure controls can be performed. Therefore, preferable is a system in which by using the servo motor or the like, the number of rotations of the motor is controlled.

For example, the case where a servo motor constituted of a motor, a driver and a programmable controller (PLC) is used will be described. The driver is connected to the PLC. In response to an output indicative of a motor operating condition transmitted to the PLC and an instruction of PLC, the motor is operated. The motor rotates in proportion to the number of pulses received by the driver from the PLC. The rotation speed is changed in accordance with the rate (time density) of the pulse. Then, when a high-pressure pump is operated by the servo motor, the liquid flow rate is generally proportional to the number of rotations of the motor (positioning). The liquid pressure is proportional to the number of rotations of the motor.

The injection of the liquid substance into the green meat by means of the pickle injector of the invention is continuously repeated. When more green meats are processed, the injection frequency of the liquid substance per unit time needs to be increased. In this case, before the injection pressure is gradually raised from 0 or a low pressure is reset to 0 or the low pressure, the next injecting operation is started. As a result, the injection pressure cannot be raised gradually from 0 or the low pressure. In this case, by providing the pressure controller with the residual cut means, the injection pressure which has been gradually raised from 0 or the low pressure can be quickly reset to 0 or the low pressure. An example of the residual pressure cut means is a relief valve placed on a part of the high-pressure piping. By quickly opening the relief valve after completing the injection, the pressure of the liquid substance after the injection can be quickly reset to 0 or the low pressure. An example of another residual cut means is a means in which a buffer such as the piston cylinder for absorbing the pressure is placed on an end of a branch pipe connected to the high-pressure piping. In this case, after the injection is completed, the piston is retreated. The pressure of the liquid substance in the piping is absorbed. Then, the pressure of the liquid substance after the injection can be quickly reset to 0 or the low pressure.

As aforementioned, to obtain the uniformly dispersed condition in the green meat, by using the pickle injector of the invention, while injection is being performed, the injection pressure needs to be gradually raised from 0 or the low pressure to the maximum injection pressure at a constant pressure rising rate. The necessary maximum injection pressure can be regulated variously in accordance with physical properties of the green meat (proportion of lean and fat, meat hardness, the presence of bones and the like), thickness and configuration of the green meat, physical properties of the liquid substance (molecular weight of solute or dispersoid, viscosity, reactivity with meat components and the like), a distance between a tip end of the coherent stream injection nozzle and the green meat and the like. The maximum injection pressure is usually set In the range of 7 to 3000 $kg/cm^2$, preferably 300 to 2000 $kg/cm^2$.

If the maximum injection pressure is less than 7 $kg/cm^2$, the injection pressure is lower than a stress of the green meat. Therefore, the liquid substance is not sufficiently dispersed in the green meat. Conversely, if the maximum injection pressure exceeds 3000 $kg/cm^2$, the green meat is disadvantageously damaged.

Therefore, when the thickness of the usually used meat, the dispersion in the green meat, damages and the like are considered, the maximum injection pressure is preferably set variously in the range of 300 to 2000 $kg/cm^2$. The high-pressure liquid generator in the pickle injector of the invention preferably has an ability to apply various pressures in the range up to 3000 $kg/cm^2$.

For example, the physical properties of the green meat is largely related with the injection resistance to the meat. The stress varies from about 7 $kg/cm^2$ to 26 $kg/cm^2$ with derivation or portion of the meat. The injection pressure of the conventional multi-needle pickle injector is about 12 $kg/cm^2$ at maximum, which causes ununiformity in injection because of a difference in derivation and portion of the meat. However, in the uniformly dispersed injection method of the liquid substance into the green meat according to the invention, a remarkably high injection pressure (coherent stream injection pressure) is used. Therefore, the problem of non-uniform dispersion in an injection direction and a direction crossed at right angles to the injection direction due to a difference between injection resistances of the meat is solved. Also, by pressing the green meat by the manifold of the injecting section of the pickle injector with a constant force, the precision of uniform dispersion is further raised.

To prevent the liquid substance from passing through the green meat and spouting out of the green meat or conversely to prevent the liquid substance from being insufficiently injected and dispersed to the end, there is a technique in which a meat thickness is beforehand made constant by using a press roller or the like. As aforementioned, by controlling/adjusting the maximum injection pressure of the liquid substance from the coherent stream injection nozzle, the injection depth of the liquid substance can be controlled. Therefore, by providing the pickle injector of the invention with a meat thickness measurement section, the maximum injection pressure is calculated based on a measured value. All processes for controlling the pressure can be completely automated. The meat thickness measurement section preferably has a mechanism for automatically measuring the meat thickness. For example, as the automatic meat-thickness measurement mechanism for measuring a distance between upper and lower surfaces of the green meat, there is a system in which a nozzle disposed on a tip end of a robot hand is brought into contact with the green meat to automatically measure the meat thickness on the basis of a displacement of a potentiometer, and a system for automatically measuring the meat thickness by using a photo sensor. Furthermore, a system for automatically calculating the meat thickness by image processing can also be employed. Additionally, the automatic meat-thickness measurement may be performed before the liquid substance is injected to the green meat. It can be performed simultaneously with the injection in the same manner as the case where measurement is performed by using the nozzle on the tip end of the robot hand.

Also, in the cases of a green meat having a constant thickness, a green meat having constant physical properties and the like, the maximum injection pressure can be preset. Especially, in the case of green meats such as outside and boston butt in which a hard film-like layer constituted of a connective tissue exists, and in the case of a green meat such as belly in which lean and fat are alternately laminated and a hard film-like layer constituted of a connective tissue exists, the maximum injection pressure may be preset in such a manner that the liquid substance can pass through the green meat and spout out of the green meat. For example, for the belly as a raw material of bacon, in the conventional multi-needle pickle injector, the liquid substance is inhibited by the hard film-like layer constituted of the connective tissue from penetrating further. Additionally, since the liquid substance is accumulated in fat layers in which the liquid substance does not have to be dispersed, the soft fat layers disadvantageously swell. However, according to the invention, the liquid substance is hardly dispersed in the fat layers with a small stress, but uniformly dispersed entirely in lean layers including the hard film-like layer and farther layers. A superior bacon can thus be obtained.

In the invention, as aforementioned, by controlling/adjusting the injection time elapsed until the maximum injection pressure of the liquid substance from the coherent stream injection nozzle is reached, the injection quantity of the liquid substance can be controlled. The injection time elapsed until the maximum injection pressure is reached can be set variously in accordance with the property of meat, physical properties of the liquid substance or the like. The injection time is usually set to 0.05 to 10 seconds, preferably 0.1 to 5 seconds, more preferably 0.3 to 2 seconds.

If the injection time is less than 0.05 second, a necessary pressure is not reached or a small flow rate may result in insufficient dispersion in the green meat. Also, if it exceeds 10 seconds, injection takes time, the injection quantity increases, but a retention force of the liquid substance in the green meat has a limitation. Therefore, at the time of injection, the quantity of liquid substance leaking from injected portions increases. The precision of injection ratio tends to be worsened.

In respect of a high precision of the set injection ratio and the injection efficiency, the injection time is preferably set to 0.3 to 2 seconds.

In the invention, as aforementioned, by changing the pressure rising rate of the liquid substance from the coherent stream injection nozzle, the injection ratio of the liquid substance into the green meat can be controlled/adjusted. In the conventional method in which the liquid substance is injected, for example, only by opening/closing one valve instead of controlling the injection pressure during injection as in the invention, the pressure momentarily rises. Thereafter, the pressure changes as shown in the aforementioned FIG. 4. In the conventional method, the injected liquid substance cannot be uniformly dispersed in the green meat. However, in the invention, by setting the pressure rising rate to 100 to 20000 $kg/cm^2 \cdot second$, preferably 200 to 10000 $kg/cm^2 \cdot second$, more preferably 1000 to 4000 $kg/cm^2 \cdot second$, control is performed while injection is being performed, so that the liquid substance can be uniformly dispersed in the green meat.

When the pressure rising rate is less than 100 $kg/cm^2 \cdot second$, injection takes time, the injection quantity increases, but the retention force of the liquid substance in the green meat has a limitation. Therefore, the quantity of return pickle increases, and the precision of injection ratio tends to be worsened.

Also, when the pressure rising rate exceeds 20000 $kg/cm^2 \cdot second$, the pressure rising rate is so fast that the pressure rises at a dash like in the needleless injection of conventional patents in which the valve is opened/closed. It is difficult to control the injection pressure while injection is being performed. Therefore, sufficient dispersion in the green meat cannot be achieved.

Further, to achieve a higher precision of the preset injection ratio and sufficiently uniform dispersion of the liquid substance in the green meat, the pressure rising rate is preferably set to 1000 to 4000 $kg/cm^2 \cdot second$.

As aforementioned, the injection depth is proportional to the maximum injection pressure, and the injection quantity is proportional to the injection reaching time. For example, in the case of injection performed at the constant nozzle interval and at the equal density, when the pressure rising rate is the same, the thicker the green meat is, the higher the maximum injection pressure becomes. In proportion to this, the injection time is lengthened, and the injection quantity is increased. Conversely, when the green meat is thin, the maximum injection pressure is lowered, and in proportion to this, the injection time is shortened. Therefore, the injection quantity is decreased.

For example, in the case that after the liquid substance is injected to a 10 cm square green meat, it is injected to a green meat reduced by 5 cm of half only in height at the same pressure rising rate, the necessary maximum injection pressure becomes half from a relationship between the maximum injection pressure and the injection depth. Since the pressure rising rate is the same, the injection time also becomes half. As a result, since the green meat reduced half only in height has a half injection weight, the same injection ratio is obtained.

Therefore, if the injection is performed at the same pressure rising rate at the constant nozzle interval at the equal density, the injection quantity per unit volume is always equal, even in the case that the width, thickness or size of the green meat differs, whereby the same injection ratio can be obtained.

Also, in the case that the liquid substance is injected to the green meat having the same thickness at the constant nozzle interval at the equal density, the injection time is shortened and the injection quantity is reduced, when the pressure rising rate is increased. As a result, the injection ratio is lowered. Conversely, when the pressure rising rate is lowered, the injection time is lengthened and the injection quantity is increased. As a result, the injection ratio increases.

Therefore, by changing the pressure rising rate, the injection quantity per unit time changes. Consequently, by adjusting the pressure rising rate, the injection ratio can be controlled.

These controls are performed by the pressure adjustment means. Needless to say, the pressure can be adjusted not only manually but also automatically by a computer and an actuator based on the information of meat thickness and injection ratio.

In the invention, even substances which can scarcely be dispersed in the green meat can be uniformly injected and dispersed. Examples of the substances which can scarcely be dispersed in the green meat include enzyme, microorganisms (lactic bacteria, yeast and the like), high-molecular substances, and substances with a high reactivity with meat constituent substances. The substances cannot easily move inside the green meat after injection or cannot be easily dispersed even by dynamic stimulus, standing period or another means. However, in the uniformly dispersed injection method of the invention, the maximum injection pressure is remarkably high as compared with the aforementioned multi-needle injection method. Also, by controlling the pressure rising rate, even the hardly dispersed substances can be uniformly dispersed in the green meat.

In the pickle injector for use in the invention, by narrowing the nozzle interval to 10mm or less, e.g., 5.6 mm, injection can be performed. Therefore, highly-dense and uniform injection is feasible. Since the injection depth can be controlled by adjusting the maximum injection pressure, the liquid substance is uniformly dispersed in the green meat at the time of injection. Thus, even the substances which can scarcely be dispersed in the green meat are uniformly dispersed in the entire green meat simultaneously with injection.

In the invention, when the liquid substance is injected and dispersed into the green meat by using the pickle injector, the tip end of the coherent stream injection nozzle is brought into contact with the green meat. By spouting straight the liquid substance, the liquid substance is preferably injected and dispersed into the green meat. In the case that the pickle injector is used for the curing and seasoning of the meat, if a clearance is made between the coherent stream injection nozzle and the green meat as an object of injection, straightness is excessively strong, so that the dispersion is poor. However, the larger the clearance is, the higher the mix proportion of air becomes. When the invention is applied to a hard lean meat, a meat product with a different texture can be obtained on occasion.

The pickle injector of the invention has a mechanism for determining an injection position when the liquid substance is injected to the green meat, i.e., an injection positioning mechanism. The injection positioning mechanism is roughly divided into a mechanism in which the injecting section is fixed in at least a conveying direction of the green meat and a mechanism in which the injecting section is moved in at least the conveying direction of the green meat.

When the injecting section is fixed in at least the conveying direction of the green meat, as the injection positioning mechanism, there can be exemplified a conveyor for intermittently conveying the green meat to a predetermined position having the injecting section in the same manner as in the conventional multi-needle injector. When the green meat is stationary, the liquid substance is injected. Then, if the meat thickness is constant, the fixed injecting section does not have to be vertically moved. Usually, when the green meat is conveyed to the predetermined position and stands still, the fixed injecting section is lowered to inject the liquid substance from a top surface of the green meat or elevated to inject the liquid substance from an under surface of the green meat.

On the other hand, when the injecting section is moved, as the injection positioning mechanism, a robot hand having an injecting section on its tip end can be exemplified. The tip end having the injecting section of the robot hand is controlled by a controller or the like in compliance with the green meat continuously or intermittently conveyed. Further, the robot hand can preferably move along X, Y and Z axes (the robot hand can move freely vertically, horizontally and back to forth). When the liquid substance is injected to the green meat by using the pickle injector having the robot hand, injection can be performed from one direction or two or more directions. The injection direction is not limited to a vertical direction. By sequentially moving/rotating the nozzle position or a green meat mount, injection can be performed from one direction or two or more directions, e.g., from the side, from below or the like.

Also, a robot hand can be used which can not only move along the X, Y and Z axes but also direct its tip end to all azimuths in such a manner that injection can be performed from any face of the green me it. When the pickle injector having the robot hand is used, the configuration of the green meat is automatically measured by a photo sensor or the like. In accordance with the measured configuration of the meat, injection can be performed simultaneously or sequentially from two or more directions without sequentially moving/rotating the green meat mount.

Then, when the tip end of the injection robot hand is provided with a green meat conveying means, by moving the green meat with the robot hand, the liquid substance is injected. Simultaneously with completion of the injection, the treated green meat can also be conveyed to the next process step. When the liquid substance is injected by moving the green meat with the green meat conveying means on the tip end of the robot hand, the green meat is fixed from opposite sides with a meat fixing slide guide before injection. This is preferable because no damage is given to the meat. However, when muscle fibers or another tissue of the meat is cut, a coherent stream may be injected by continuously moving the green meat. As the green meat conveying means available is a means having a conveying claw or a conveying suction portion. For secure conveyance, a means having a conveying claw is preferable.

Additionally, the injection positioning mechanism, the conveying claw and the like of the robot hand for moving the green meat during the injection process are preferably operated according to a preset program or a program based on the configuration or the like of the green meat.

Figure 6:
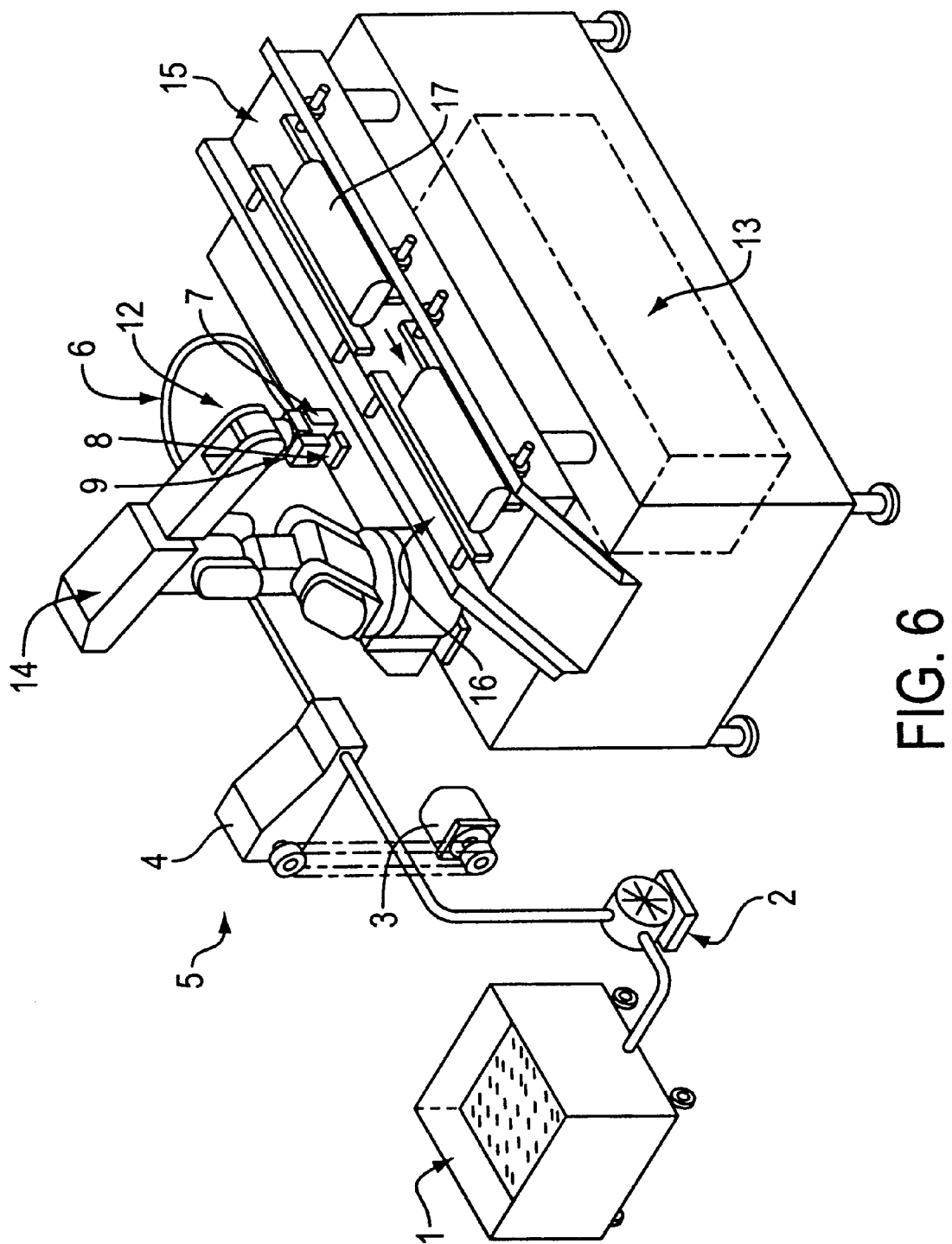
FIG. 6 is a perspective view of a pickle injector of the invention.
Figure 7:
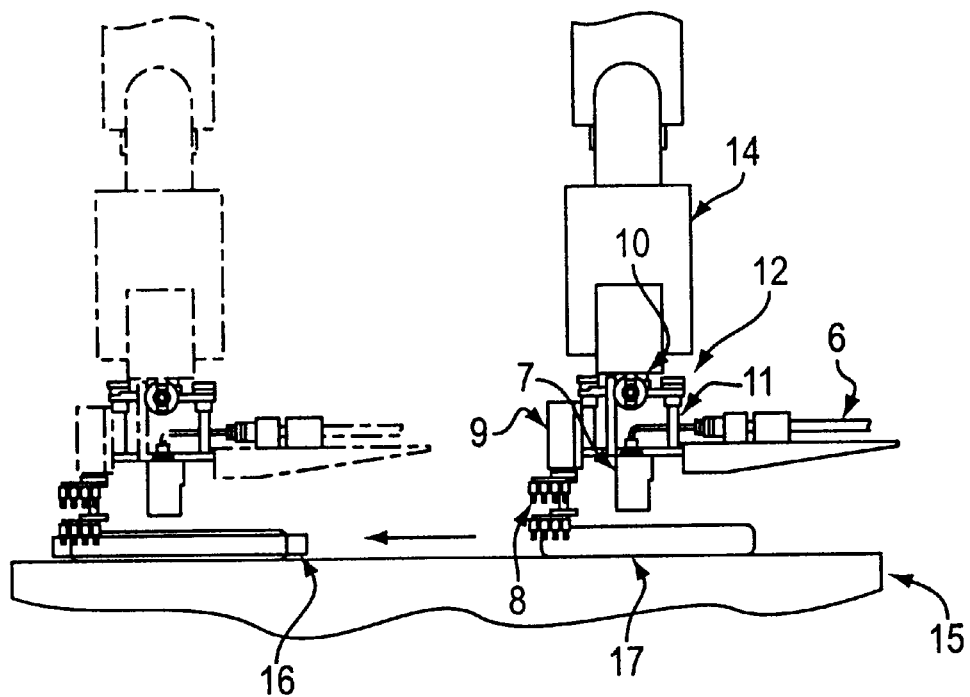
FIG. 7 is a front view of a robot in the pickle injector of the invention.

A needleless pickle injector for use in the injection method of the invention will be described with reference to FIGS. 6 and 7.

The needleless pickle injector is constituted of a liquid tank 1 containing the liquid substance therein; a diaphragm pump 2; a high-pressure liquid generator 5 comprising a servo motor 3 and a high-pressure plunger pump 4 for operating the high-pressure plunger pump 4 with the servo motor 3 to increase a pressure of the liquid substance from the liquid tank 1; a high-pressure piping 6 constituted of a flexible hose with a withstanding pressure of 3500 kg/cm$^2$ and a stainless piping with a withstanding pressure of 4200 kg/cm$^2$; a robot hand 14 with a tip end having a manifold 7 provided with a straight water flow injection nozzle (coherent stream injection nozzle), a cylinder piston 9 for vertically moving a green meat conveying claw 8, and a meat-thickness measurement section 12 constituted of a potentiometer 10, a spring 11 and the like, and with the above-mentioned tip end being controlled by a controller 13 or the like to be movable along X, Y and Z axes (freely movable vertically, horizontally and back to forth); a green meat conveying section 15 connected to a green meat conveyor (not shown); and a green meat fixing guide 16 mounted on the green meat conveying section 15 in the injection position of the liquid substance.

The injection method using the device will be described. When a green meat 17 conveyed from the green meat conveyor is laid on one end of the green meat conveying section 15, the tip end of the robot hand 14 moves toward the green meat 17. The green meat conveying claw 8 attached to the tip end is lowered by the cylinder piston 9 to catch the green meat 17 and convey it to the injection position of the liquid substance. The green meat 17 conveyed to the injection position is fixed by the green meat fixing guide 16. Additionally, the tip end of the robot hand 14 is lowered, and the tip end of the manifold 7 presses against the green meat 17. Simultaneously, compression pressure is absorbed by the spring 11. Its displacement is detected by the potentiometer 10 and calculated. Then, the meat thickness is automatically measured. Based on the measured value calculated is a pre-programmed maximum injection pressure. Information regarding the maximum injection pressure, pre-programmed injection reaching time and information regarding injection ratio are transmitted to the servo motor 3. The servo motor 3 operates the high-pressure plunger pump 4. The liquid substance is injected as a coherent stream from the tip end of the injection nozzle of the manifold 7 in contact with the green meat. As a result, while the liquid substance is injected, the injection pressure is controlled. Specifically, the injection pressure is gradually raised from 0 or a low pressure to the maximum injection pressure calculated in accordance with the meat thickness for the injection time calculated based on the injection ratio and at the pressure rising rate calculated from a difference in pressure up to the maximum injection pressure, while the liquid substance is injected to the green meat 17. Subsequently, the injection pressure is returned to 0. If necessary, the next injection is performed by moving the robot hand 14. The liquid substance is thus injected to the entire green meat 17. The green meat 17 to which the liquid substance has been injected is conveyed by the green meat conveying claw 8 attached to the tip end of the robot hand 14. Thereafter, the aforementioned operation is repeated.

Since the green meat fixing guide 16 for fixing the green meat is provided, no unnecessary scratches is made on the green meat. Also, when the manifold 7 provided with the injection nozzle is brought in contact with the green meat 17, the thickness of the green meat is made constant. As a result, the pressure of the high-pressure liquid substance can be easily controlled. Additionally, to handle the expansion of the green meat 17 by injection of the liquid substance, a spring or the like may be disposed around a mechanism for fixing the green meat 17.

Figure 8:
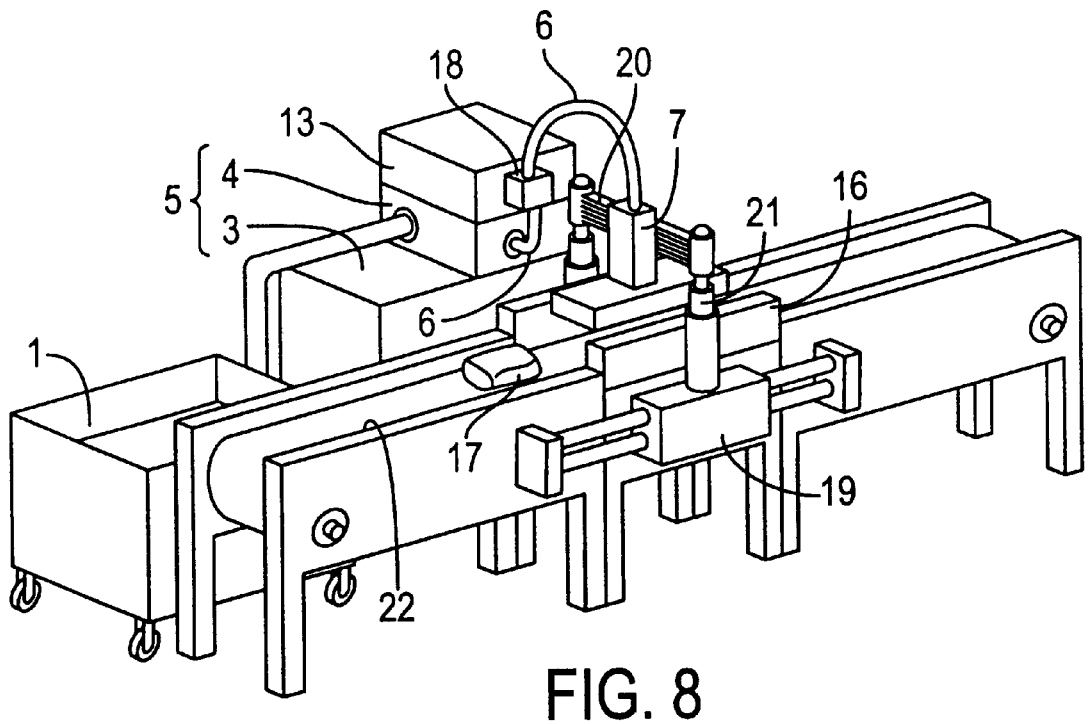
FIG. 8 is a perspective view of another pickle injector of the invention.

Another embodiment of the needleless pickle injector for use in the injection method of the invention will be described with reference to FIG. 8. Additionally, the same constituent portions as those of the aforementioned needleless pickle injector are denoted by the same numerals.

The needleless pickle injector is constituted of a liquid tank 1 containing the liquid substance therein; a high-pressure liquid generator 5 operated by a servo motor 3 to increase a pressure of the liquid substance from the liquid tank 1; a high-pressure piping 6 constituted of a flexible hose with a withstanding pressure of 3500 kg/cm$^2$ and a stainless piping with a withstanding pressure of 4200 kg/cm$^2$; a flow-rate adjustment section 18; an X-axis drive jig 19 to which a manifold 7 attached with a coherent stream injection nozzle is fixed; a Y-axis drive jig 20; a Z-axis drive jig 21; a controller 13 for controlling movements of the X-axis drive jig 19, the Y-axis drive jig 20 and the Z-axis drive jig 21, positioning an injecting section and controlling an injection pressure; a green meat conveyor 22 intermittently moving to convey a green meat 17 toward the injecting section; and a green meat fixing guide 16 for pressing and fixing the green meat 17 from opposite sides at the time of injection.

The injection method using the device will be described. When the green meat moves at the time of injection, the green meat 17 conveyed by the green meat conveyor 22 is cut by a moved distance. For the prevention of this, the green meat is held and fixed by the green meat fixing guide 16. The manifold 7 is then lowered from above to hit against the green meat. The controller 13 calculates the pressure rising rate in accordance with the injection ratio and the maximum injection pressure in accordance with the height of the injecting section. Based on information regarding the maximum injection pressure, pre-programmed injection reaching time and information regarding the injection ratio, the servo motor 3 operates the high-pressure plunger pump 4. The liquid substance is injected as a coherent stream from the tip end of the injection nozzle attached to the manifold 7 in contact with the green meat. As a result, while the liquid substance is injected, the injection pressure is controlled. After the injection at one position is completed, the controller 13 moves the manifold 7 to the next position to perform the next inject on. After completing the injection to the green meat in the region of the length of the green meat fixing guide 16, the green meat conveyor 22 is operated to convey the green meat. By repeating the aforementioned operation, the liquid substance is uniformly injected and dispersed into the green meat.

The injecting section of the injector can move in X, Y and Z directions. While the green meat 17 or another object of injection is fixed, by moving the manifold 7, injection can be performed. When the injecting section, i.e., the manifold 7 moves along three axes in the X, Y and Z directions, by fixing one axis or two axes, only the movement alone two axes or one axis is feasible.

A structure of the manifold 7 as a main part of the pickle injector will be described.

A member for branching a single flow from the high-pressure piping 6 into plural flows is called the manifold 7. The conventional injecting section of a high-pressure water device is of a single-hole system or has a radially branched piping in the manifold. The inventors et al. have prepared the manifold 7 in such a manner that it can be used as the pickle injector for meat. A piping in a manifold is branched, and branched pipes are arranged parallel. Here, the parallel arrangement includes not only the arrangement where the pipes are arranged parallel in a row but also the arrangement where the pipes are arranged zigzag or parallel in multiple rows.

The high-pressure liquid substance is spouted as a coherent stream from nozzles on tip ends of the pipes, and injection is simultaneously performed from the arranged nozzles to the meat. Also, by interconnecting plural manifolds or attaching multiple nozzles to one manifold, the liquid substance can be efficiently injected in one process.

A structure of the injecting section according to the invention will be described with reference to FIGS. 9 and 10.

In the manifold 7, thirteen branch pipes 23 are arranged at an interval of 10 mm and parallel in four rows at an interval of 10 mm. A coherent stream injection nozzle 24 is attached to a tip end of an injection hole of each branch pipe 23. An interval of adjoining nozzles 24 corresponding to a needle interval in the conventional multi-needle pickle injector is set to 10 mm. Therefore, one manifold 7 can be provided with a large number of branch pipes 23. A highly-dense injection can be performed. Additionally, the hole diameter of the coherent stream injection nozzle 24 is set to 3/1000 inch. It is known that the injection pressure is inversely proportional to the nozzle-hole diameter multiplied four times. The smaller the diameter is, the higher pressure can be obtained.

The liquid substance is injected by the pickle injector constituted as aforementioned. In this case, since the means is provided for controlling the pressure while injecting, the pressure can be gradually raised to the maximum injection pressure suitable for the meat thickness at the pressure rising rate set in accordance with the injection ratio. When the pressure rises, the liquid substance in the green meat advances further and is then dispersed transversely by the resistance of the next meat tissue. By repeating the operation, the liquid substance can be uniformly dispersed in the green meat.

Then, since no injection needle is used, the nozzle interval can be remarkably narrowed, as compared with the conventional multi-needle pickle injector. Additionally, in the constitution of the injecting section, one or plural manifolds in which the branch pipes are parallelly arranged are connected, thereby accomplishing the plural parallel injections by one drive at a high density. Therefore, in one process, the liquid substance can be efficiently injected into the green meat and simultaneously dispersed.

Also, the method in which the injection depth can be controlled by adjusting the maximum injection pressure has been obtained. Therefore, the liquid substance can be uniformly injected and dispersed into thin and thick green meats by using the same machine. Also, the method in which the injection depth is controlled by adjusting the maximum injection pressure and the method in which the injection quantity is controlled by adjusting the injection time have been obtained. Therefore, by adjusting the pressure rising rate, the injection ratio can be controlled.

Further in the pickle injector for use in the invention, by using the high-pressure liquid generator, injection is performed under a remarkably higher pressure than the resistance pressure of the meat. Therefore, the liquid substance can be uniformly injected to both hard and soft meats in the same manner. It has been found that the difference of injection resistance in meat property which is a problem of the conventional multi-needle pickle injector has little influence.

A method of manufacturing a raw ham by using the pickle injector provided with the injecting section of the invention will be described. In the injecting section, the coherent stream injection nozzles are arranged at a high density.

For the manufacture of the raw ham, a dry curing method, a brine curing method or a single needle injection method is used. However, in either method, the manufacture requires much time. A dispersion tends to occur in a dispersed condition of curing agent in individual green meats, meat portions and surface and central portions. Since the raw ham has a high salt concentration, the dispersion of the dispersed condition has a large influence on a quality. Also, since no heating process is performed; the curing agent needs to be dispersed with a sufficient care for safety. Therefore, according to the food hygiene law, the injection method by means of an automatic injector using multiple needles is not authorized as the curing method of the raw ham. Because when the needles are used, there is a possibility that the depth of the meat is contaminated with microorganisms on the surface of the green meat. Also, the brine leaking from the meat at the time of injection is collected for reuse.

On the other hand, in the invention, since no needle is used, no contamination of the microorganisms is caused by the needles inside the green meat. Simultaneously with injection, the brine is densely dispersed in the meat. At the time of injection the brine scarcely leaks from the meat. Therefore, the manufacture can be performed without using the brine contaminated with the microorganisms at the time of injection.

Additionally, since the brine is uniformly dispersed in the meat, simultaneously with injection all portions of the green meat, a securely lowered water activity value of cured meat is obtained as defined by the food hygiene law. As aforementioned, according to the invention, the injection liquid is uniformly dispersed in the meat. A fine dispersion occurs, and a stabilized quality is obtained. Also in respect of safety, the number of bacteria and also the water activity value can conform with specifications and standards of the food hygiene law.

Further, since the injection quantity of the Brine can be properly changed, even a product with any salt concentration can be easily prepared.

Next, embodiments of the invention will be described in more detail, but the technical scope of the invention is not limited to these embodiments.

Embodiment 1

By using the aforementioned injection device, injection is performed as follows. When the pork block 17 conveyed from the green meat conveyor is laid on one end of the green meat conveying section 15, the tip end of the robot hand 14 moves toward the pork block 17. By the green meat conveying claw 8 attached to the tip end, the pork block 17 is conveyed to the injection position of the liquid substance. The pork block 17 conveyed to the injection position is fixed by the green meat fixing guide 16. Additionally, the tip end of the robot hand 14 is lowered, and the tip end of the manifold 7 presses against the pork block 17. Simultaneously, compression pressure is absorbed by the spring 11. Its displacement is detected by the potentiometer 10 and calculated. Then, the meat thickness is automatically measured. On the basis of the measured value, a pre-programmed maximum injection pressure is calculated. Information regarding the maximum injection pressure, pre-programmed injection reaching time and information regarding injection ratio are transmitted to the servo motor 3. The servo motor 3 operates the high-pressure plunger pump 4. The liquid substance is injected as a coherent stream from the tip end of the injection nozzle 24 in contact with the pork block. The pressure is returned to 0. Subsequently, the operation is repeated in accordance with the program of the robot hand 14 incorporated in the controller 13. After the liquid substance is injected to the entire pork block 17, the pork block 17 is conveyed outside by the green meat conveying claw 8 attached to the tip end of the robot hand 14.

Figure 11:
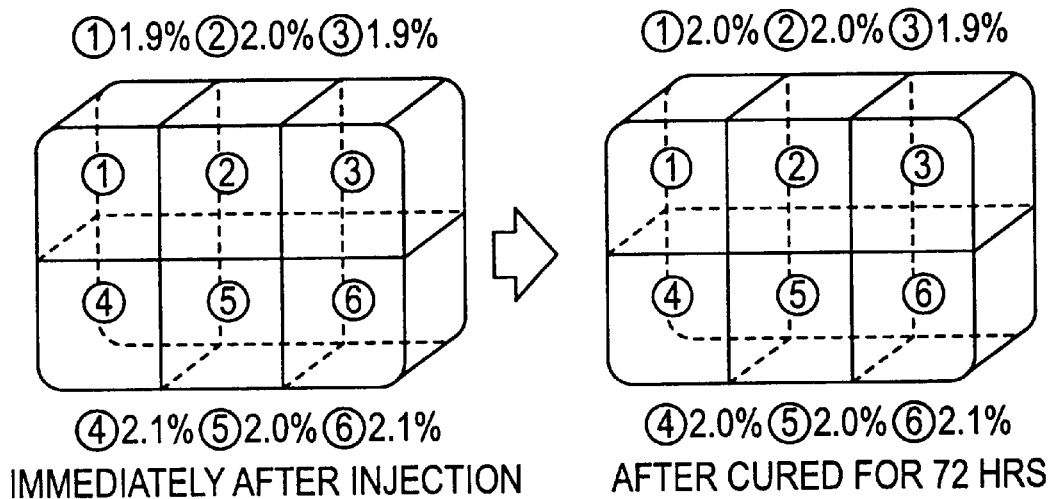
FIG. 11 is an explanatory view showing a comparison of a distributed condition of salt after injection between the pickle injector of the invention and a conventional multi-needle pickle injector.

FIG. 11 shows a comparison of a distributed condition of salt content after injection between the test and a test which was performed by using the same liquid substance, the equivalent pork block and the conventional multi-needle pickle injector. The upper half of FIG. 11 shows the distributed condition of salt content after injection when the pickle injector of the invention is used. The lower half thereof shows the distributed condition of salt content after injection when the conventional multi-needle pickle injector is used. Additionally, the left side shows the distributed condition immediately after injection, while the right side shows the distributed condition after the pork block is cured for 72 hours.

The distributed condition is measured by dividing each pork block vertically into two and horizontally into three to obtain test pieces of six positions in total. As clearly seen from FIG. 11, in the injection method into the meat according to the invention, the liquid substance can be remarkably uniformly injected and simultaneously uniformly dispersed, as compared with the conventional multi-needle pickle injector.

Embodiment 2

An embodiment of the pickle injector of the invention using an injecting section with coherent stream injection nozzles arranged therein at a high density will be described.

Table 1 shows a comparison of injection ratio between the injection with the pickle injector including the injecting section with 60 coherent stream injection nozzles attached thereto to portions of pork ham: outside; inside; rump; knuckle and outside (M. Semitendinosus), and the injection with the conventional multi-needle pickle injector. Additionally, 40 blocks were used as sample pork blocks for each injection case.
[Table 1]

As seen from Table 1, for the standard deviation in the whole, the conventional multi-needle pickle injector shows 7.3%. On the other hand, in the injection method of the invention the deviation is very small as 0.8%. A remarkably fine dispersion of the injection ratio occurs.

Additionally, in the conventional multi-needle pickle injector, maximum and minimum values are treated as defective numerical values. In the invention, however, maximum and minimum values are in an allowable product range. It has been found that by using the pickle injector of the invention, the number of defective products is reduced.

Embodiment 3

Another embodiment of the pickle injector of the invention using the injecting section with coherent stream injection nozzles arranged therein at a high density will be described.

Table 2 shows a comparison of the injection ratio of injection to pork loin between the pickle injector of the invention and the conventional multi-needle pickle injector. As samples, 50 blocks of pork blocks were used.
[Table 2]

Pork loin is a long green meat called M. Longissimus dorsi extending from shoulders to ham. The meat on the side of ham is harder. When the liquid substance is injected to one block of loin in the same manner, usually the liquid substance does not easily enter the meat on the side of thighs and excessively enters the meat on the side of shoulders.

A right column of Table 2 shows results of the conventional multi-needle pickle injector. Toward the meat on the side of shoulders the injection ratio increases. Additionally, a large dispersion occurs.

A left column of Table 2 shows results of the pickle injector of the invention. The hardness of the meat has little influence, and a small dispersion occurs.

Embodiment 4

An embodiment of injection to fish meat with the pickle injector of the invention using the injecting section with coherent stream injection nozzles arranged therein at a high density will be described. A half piece of salmon was divided into four from head toward tail. Table 3 shows a comparison of the injection ratio between the pickle injector of the invention and the conventional injector (the number of samples is ten for each). Additionally, as samples, 10 salmons were used.
[Table 3]

In the fish meat there is a gradient in thickness from head toward tail. The liquid substance does not easily enter a thin tail meat.

As shown in Table 3, when the conventional injector is used, the injection ratio in the thin tail meat is lower than in a thick middle meat. However, when the pickle injector of the invention is used, the thickness has little influence on the injection ratio.

Also, for the standard deviation of the whole, as compared with 5.5% of the conventional injector, 0.8% of the pickle injector of the invention is very small. It has been clarified that in the same manner as the aforementioned embodiments of pork loin and ham, even in the injection to the fish meat, the dispersion of the injection ratio is remarkably reduced.

Embodiment 5

An embodiment of injection of a brine with red No. 3 for food coloring dissolved therein to pork loin with the pickle injector of the invention will be described. The pickle injector is provided with the injecting section in which coherent stream injection nozzles are arranged at a high density.

FIG. 12 shows a comparison of a dispersed condition in the case of injection of the injection liquid to pork loin between the pickle injector of the invention and the conventional multi-needle pickle injector. The upper half of FIG. 12 shows the dispersed condition after the injection using the pickle injector of the invention. The lower half shows the dispersed condition after the injection using the conventional multi-needle pickle injector. Also, the left side shows the dispersed condition immediately after the injection, while the right side shows the dispersed condition after the pork loin is cured for 72 hours.

As clarified by results shown in FIG. 12, when the conventional multi-needle pickle injector is used for injection, a poorly dispersed condition is obtained immediately after the injection. The red No. 3 for food coloring or another substance which has a high reactivity with protein in the meat cannot move after injected into the green meat. Therefore, no change occurs in the dispersed condition even after the green meat is cured for 72 hours. On the other hand, when the pickle injector of the invention is used for injection, the red No. 3 for food coloring is uniformly dispersed immediately after the injection.

Embodiment 6

Table 4 shows the yield during manufacturing processes, the manufacture period and the results of sensory evaluation on products in the case of manufacture by using the injection method of the invention and the conventional dry curing method.

As seen from Table 4, in the dry curing method, curing time requires 2 weeks and completing products requires about three weeks. On the other hand, in the injection method of the invention, curing requires 1 day and completing products requires less than one week. The manufacture period can be largely reduced. Additionally, the manufacture yield is increased. Also, in the sensory evaluation, there is no dispersion of salt content, and there is a wet and satisfactory feel. The sensory evaluation was performed by a ten-specialist panel.

As aforementioned, according to the injection method of the invention, the brine is uniformly dispersed in the meat, and a stable quality with a fine dispersion is obtained. For safety, the number of bacteria and also the water activity value conform with specifications and standards of the food hygiene law. Such raw-ham product can be obtained.

[Table 4]

Embodiment 7

Figure 13:
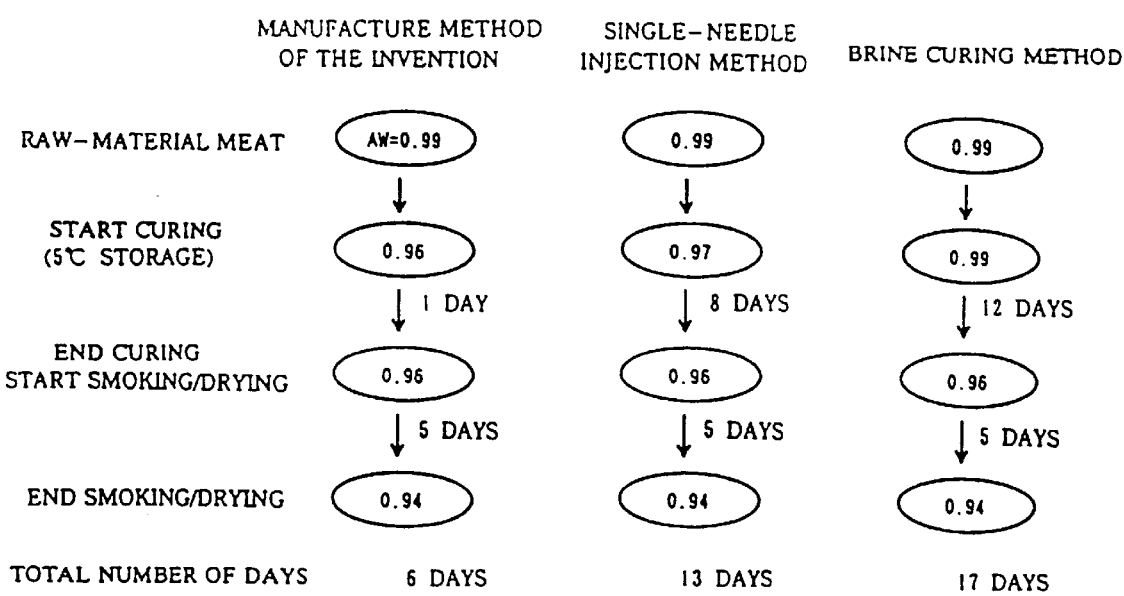
FIG. 13 is an explanatory view showing transition of the raw ham manufacture period and the central-portion water activity value.

In the curing process for the manufacture of a raw ham by using a block of pork loin, transition results of manufacture periods and water activity values of central portions are shown in FIG. 13 for the cases of manufacture in which the injection method of the invention, the conventional single needle injection method and the brine curing method are applied. As seen from FIG. 13, according to the method of the invention, the injection liquid is uniformly dispersed in the meat with a fine dispersion. In only one day for curing, the water activity value becomes less than 0.97. The curing period can be largely reduced, as compared with the single-needle method and the brine curing method. Also, in the same manner as the raw-ham product manufactured in the aforementioned conventional method, the number of bacteria in the raw-ham product manufactured according to the invention conforms with the specifications and standards of the food hygiene law. In the requirement, in 1 g of test specimen, the number of *Escherichia coli* (*E.coli*) is 100 or less, the number of *staphylococcus aureus* is 1000 or less and salmonella exhibits negative. According to the invention, a raw-ham product with no problem also in respect of safety can be obtained.

Industrial Applicability

As clearly seen from the above description, the present invention has the following effects:

1. By the method in which the high-pressure pickle injector is used, the meat and the coherent stream injection nozzle are brought in contact with each other and the pressure is controlled while injecting the liquid substance, the liquid substance can be remarkably uniformly injected and dispersed as compared with the conventional method. The method of the invention can be applied to the method of manufacturing raw ham.

Further, in the method, the ununiformity of injection of the liquid substance caused by the difference of injection resistance in meat property can also be solved.

2. Further, the method can be used to physically disperse a substance with a bad dispersed property in green meat. The substance which has not been able to be used in the brine composition for curing can be used.

3. Since the uniform dispersion is substantially completed immediately after the injection, a dynamic stimulus does not need to be applied for a long time with a tumbling machine, a massage machine or the like. The curing time or the seasoning time can be largely reduced.

4. The method of controlling the injection depth by adjusting the maximum injection pressure is obtained. Therefore, the liquid substance can be uniformly injected and dispersed into thin and thick green meats. Also, since no needle is used, the liquid substance can be uniformly injected and dispersed into fish meat or raw-material meat with bones or skins to which the multi-needle type cannot be applied or is defectively applied.

5. The method of controlling the injection depth can be obtained by adjusting the maximum injection pressure, and the method of controlling the injection quantity can be obtained by adjusting the injection time. Therefore, by adjusting the pressure rising rate, the injection ratio can be controlled. Products with different injection ratios and multiple standards can be manufactured.

TABLE 1

|  |  | PICKLE INJECTOR OF THE APPLICATION | CONVENTIONAL MULTI-NEEDLE PICKLE INJECTOR |
|---|---|---|---|
| OUTSIDE | AVERAGE VALUE | 121.2 | 108.8 |
|  | STANDARD DEVIATION | 0.8 | 1.0 |
|  | MAXIMUM VALUE | 122.5 | 109.7 |
|  | MINIMUM VALUE | 120.0 | 107.0 |
| INSIDE | AVERAGE VALUE | 121.1 | 127.1 |
|  | STANDARD DEVIATION | 0.8 | 4.8 |
|  | MAXIMUM VALUE | 122.2 | 134.7 |
|  | MINIMUM VALUE | 120.0 | 121.1 |
| RUMP | AVERAGE VALUE | 121.5 | 125.1 |
|  | STANDARD DEVIATION | 0.8 | 3.8 |
|  | MAXIMUM VALUE | 122.3 | 132.8 |
|  | MINIMUM VALUE | 120.0 | 120.4 |
| KNUCKLE | AVERAGE VALUE | 121.2 | 120.7 |
|  | STANDARD DEVIATION | 0.8 | 3.2 |
|  | MAXIMUM VALUE | 122.0 | 130.6 |
|  | MINIMUM VALUE | 120.0 | 113.3 |

TABLE 1-continued

| | | PICKLE INJECTOR OF THE APPLICATION | CONVENTIONAL MULTI-NEEDLE PICKLE INJECTOR |
|---|---|---|---|
| OUTSIDE (H.Semitendino-sus) | AVERAGE VALUE | 120.3 | 122.4 |
| | STANDARD DEVIATION | 0.7 | 3.9 |
| | MAXIMUM VALUE | 121.1 | 126.3 |
| | MINIMUM VALUE | 119.2 | 115.9 |
| WHOLE | AVERAGE VALUE | 121.1 | 120.8 |
| | STANDARD DEVIATION | 0.8 | 7.3 |
| | MAXIMUM VALUE | 122.5 | 134.7 |
| | MINIMUM VALUE | 119.2 | 107.0 |

TABLE 2

SIDE OF HAM | (1) | (2) | (3) | (4) | SIDE OF SHOULDER

| | | PICKLE INJECTOR OF THE APPLICATION | CONVENTIONAL MULTI-NEEDLE PICKLE INJECTOR |
|---|---|---|---|
| (1) | AVERAGE VALUE | 120.2 | 113.9 |
| | STANDARD DEVIATION | 0.8 | 3.4 |
| | MAXIMUM VALUE | 121.3 | 120.3 |
| | MINIMUM VALUE | 118.8 | 108.6 |
| (2) | AVERAGE VALUE | 120.3 | 119.3 |
| | STANDARD DEVIATION | 0.7 | 5.2 |
| | MAXIMUM VALUE | 121.1 | 125.3 |
| | MINIMUM VALUE | 118.9 | 110.6 |
| (3) | AVERAGE VALUE | 120.7 | 122.8 |
| | STANDARD DEVIATION | 0.7 | 4.3 |
| | MAXIMUM VALUE | 121.6 | 128.3 |
| | MINIMUM VALUE | 119.8 | 115.3 |
| (4) | AVERAGE VALUE | 120.5 | 124.6 |
| | STANDARD DEVIATION | 0.7 | 5.3 |
| | MAXIMUM VALUE | 121.8 | 130.5 |
| | MINIMUM VALUE | 119.4 | 115.6 |
| WHOLE | AVERAGE VALUE | 120.4 | 120.2 |
| | STANDARD DEVIATION | 0.7 | 6.1 |
| | MAXIMUM VALUE | 121.8 | 130.5 |
| | MINIMUM VALUE | 118.8 | 108.6 |

TABLE 3

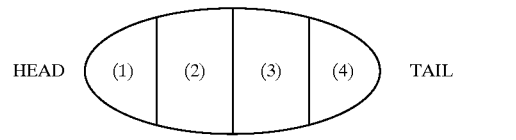

| | | PICKLE INJECTOR OF THE APPLICATION | CONVENTIONAL INJECTOR |
|---|---|---|---|
| (1) | AVERAGE VALUE | 110.3 | 109.8 |
| | STANDARD DEVIATION | 0.9 | 4.8 |
| | MAXIMUM VALUE | 111.6 | 118.4 |
| | MINIMUM VALUE | 109.2 | 104.1 |
| (2) | AVERAGE VALUE | 110.1 | 113.7 |
| | STANDARD DEVIATION | 0.6 | 5.1 |
| | MAXIMUM VALUE | 110.9 | 121.3 |
| | MINIMUM VALUE | 109.2 | 106.9 |
| (3) | AVERAGE VALUE | 109.7 | 112.8 |
| | STANDARD DEVIATION | 0.6 | 5.7 |
| | MAXIMUM VALUE | 110.5 | 122.6 |
| | MINIMUM VALUE | 108.9 | 105.8 |
| (4) | AVERAGE VALUE | 109.8 | 106.2 |
| | STANDARD DEVIATION | 0.9 | 3.5 |
| | MAXIMUM VALUE | 110.8 | 113.4 |
| | MINIMUM VALUE | 108.5 | 102.4 |
| WHOLE | AVERAGE VALUE | 110.0 | 110.6 |
| | STANDARD DEVIATION | 0.8 | 5.5 |
| | MAXIMUM VALUE | 111.6 | 122.6 |
| | MINIMUM VALUE | 108.5 | 102.4 |

TABLE 4

| | | MANUFACTURE METHOD OF THE INVENTION | | DRY CURE METHOD | |
|---|---|---|---|---|---|
| | | PROCESS YIELD | MANUFACTURE PERIOD | PROCESS YIELD | MANUFACTURE PERIOD |
| BLENDING | MEAT | 100.0% | | 100.0% | |
| | CURING AGENT | 10.0% | | 10.0% | |
| | TOTAL | 110.0% | | 110.0% | |
| CURING YIELD | | 99.4% | 1 DAY | 90.0% | 14 DAYS |
| DRYING YIELD | | 84.9% | 5 DAYS | 85.0% | 5 DAYS |
| TOTAL | | 92.8% | 6 DAYS | 84.2% | 19 DAYS |
| SENSORY EVALUATION | FEEL | SOFT AND GOOD | | DRY AND HARD | |
| | TASTE | GOOD | | PARTIALLY SALTY | |

What is claimed is:

1. A method for injecting a liquid substance into a green meat wherein, when the liquid substance is injected into the green meat by using a straight water flow injection nozzle or a coherent stream injection nozzle, the injection pressure is controlled while the liquid substance is being injected.

2. The method of injecting a liquid substance into the green meat according to claim 1 wherein the change of the injection pressure is performed by a gradual rise of the injection pressure from 0 or a low pressure.

3. The method of injecting a liquid substance into the green meat according to either of claim 1 wherein by controlling a maximum value of the injection pressure, an injection depth of the liquid substance is controlled.

4. The method of injecting a liquid substance into the green meat according to claim 3 wherein the maximum value of the injection pressure is 7 to 3000 kg/cm$^2$.

5. The method of injecting a liquid substance into the green meat according to either of claim 1 wherein by controlling an injection time elapsed until the maximum value of the injection pressure is reached, an injection quantity of the liquid substance is controlled.

6. The method of injecting a liquid substance into the green meat according to claim 5 wherein the injection time taken until the maximum value of the injection pressure is reached is in the range of 0.05 to 10 seconds.

7. The method of injecting a liquid substance into the green meat according to either of claim 1 wherein by changing a rising rate of the injection pressure, an injection ratio of the liquid substance into the green meat is controlled.

8. The method of injecting a liquid substance into the green meat according to claim 7 wherein the rising rate of the injection pressure is 100 to 20000 kg/cm$^2$·second.

9. The method of injecting a liquid substance into the green meat according to either of claim 1 wherein the maximum value of the injection pressure is regulated to a predetermined value in accordance with physical properties of the green meat.

10. The method of injecting a liquid substance into the green meat according to either of claim 1 wherein processes of measuring a meat thickness of the green meat, calculating the maximum value of the injection pressure based on a measured value and performing a pressure control are all automated.

11. The method of injecting a liquid substance into the green meat according to either of claim 1 wherein the maximum value of the injection pressure is regulated to a predetermined value in accordance with the meat thickness of the green meat.

12. The method of injecting a liquid substance into the green meat according to either of claim 1 wherein a pressure rising rate is regulated to a predetermined value in accordance with physical properties of the liquid substance.

13. The method of injecting a liquid substance into the green meat according to either of claims 1 wherein the green meat is fixed.

14. The method of injecting a liquid substance into the green meat according to either of claim 1 wherein the coherent stream injection nozzle is brought in contact with the green meat.

15. The method of injecting a liquid substance into the green meat according to either of claim 1 wherein the coherent stream injection nozzle which can perform injection from one direction or two or more directions in accordance with a configuration of the green meat is used.

16. The method of injecting a liquid substance into the green meat according to either of claim 1 wherein by narrowing an injection interval, the injection is performed.

17. A method for manufacturing a meat product comprising injecting a liquid substance into a green meat according to the method of claim 1.

18. The method according to claim 17 wherein the meat product is an uncooked meat product.

19. The method according to claim 18, wherein the uncooked meat product is a raw ham.

20. A liquid substance injected meat product prepared according to the process of claim 1.

21. The meat product according to claim 20, wherein the meat product is an uncooked meat product.

22. The meat product according to claim 21, wherein the uncooked meat product is a raw ham.

* * * * *